(12) United States Patent
Malloy et al.

(10) Patent No.: US 6,629,102 B1
(45) Date of Patent: Sep. 30, 2003

(54) EFFICIENTLY UPDATING A KEY TABLE DURING OUTLINE RESTRUCTURE OF A MULTI-DIMENSIONAL DATABASE

(75) Inventors: William E. Malloy, Santa Clara, CA (US); John S. Poelman, San Jose, CA (US); Craig R. Tomlyn, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 09/628,597

(22) Filed: Jul. 28, 2000

(51) Int. Cl.[7] .............................................. G06F 17/30
(52) U.S. Cl. .......................................... 707/102; 707/10
(58) Field of Search ............................. 707/1, 2, 3, 10, 707/100, 102, 101, 104.1, 103 R

(56) References Cited

U.S. PATENT DOCUMENTS

| | | | |
|---|---|---|---|
| 5,359,724 A | 10/1994 | Earle et al. ..................... 707/1 |
| 5,404,512 A * | 4/1995 | Powers et al. .................. 707/3 |
| 5,442,784 A * | 8/1995 | Powers et al. .............. 707/102 |
| 5,905,985 A | 5/1999 | Malloy et al. .............. 707/100 |
| 5,926,818 A | 7/1999 | Malloy ........................ 707/100 |
| 5,940,818 A | 8/1999 | Malloy et al. .................. 707/2 |
| 5,943,668 A | 8/1999 | Malloy et al. .................. 707/3 |
| 5,978,796 A | 11/1999 | Malloy et al. .................. 707/3 |
| 6,122,636 A | 9/2000 | Malloy et al. .............. 707/102 |
| 6,470,344 B1 * | 10/2002 | Kothuri et al. ............. 707/100 |
| 6,480,950 B1 * | 11/2002 | Lyubashevskiy et al. ... 711/206 |

* cited by examiner

*Primary Examiner*—Diane D. Mizrahi
(74) *Attorney, Agent, or Firm*—Fay, Sharpe, Fagan, Minnich & McKee, LLP

(57) ABSTRACT

A technique for efficiently updating a key table during outline restructure of a multi-dimensional database. A command is executed in a computer to perform a database operation on a relational database stored on a data store connected to the computer. It is determined that a multi-dimensional database has been restructured. Then, a key table of the relational database is rebuilt to correspond to the restructured multidimensional database.

48 Claims, 14 Drawing Sheets

EFFICIENTLY UPDATING A KEY TABLE DURING OUTLINE RESTRUCTURE OF A MULTI-DIMENSIONAL DATABASE

CROSS-REFERENCE TO RELATED APPLICATIONS

This application is related to the following co-pending and commonly-assigned patent applications:

Application Ser. No. 09/385,317, entitled "IMPROVING MULTI-DIMENSIONAL RESTRUCTURE PERFORMANCE BY SELECTING A TECHNIQUE TO MODIFY A RELATIONAL DATABASE BASED ON A TYPE OF RESTRUCTURE," filed on Aug. 30, 1999, by Daniel M. DeKimpe et al.,;

Application Ser. No. 09/386,072, entitled "IMPROVING MULTI-DIMENSIONAL RESTRUCTURE PERFORMANCE WHEN ADDING OR REMOVING DIMENSIONS AND DIMENSION MEMBERS," filed on Aug. 30, 1999, by Daniel M. DeKimpe et al.,;

Application Ser. No. 09/356,647, entitled "IMPROVING PERFORMANCE OF TABLE INSERTION BY USING MULTIPLE TABLES OR MULTIPLE THREADS," filed on Jul. 19, 1999, by Daniel M. DeKimpe et al.,;

Application Ser. No. 09/356,471, now U.S. Pat. No. 6,421,677 issued Jul. 16, 2002, entitled "EXTENSION OF DATA DEFINITION LANGUAGE (DDL) CAPABILITIES FOR RELATIONAL DATABASES FOR APPLICATIONS ISSUING DDL STATEMENTS," filed on Jul. 19, 1999, by Daniel M. DeKimpe et al.,;

Application Ser. No. 09/356,059, now U.S. Pat. No. 6,480,848 issued Nov. 12, 2002, entitled "EXTENSION OF DATA DEFINITION LANGUAGE (DDL) CAPABILITIES FOR RELATIONAL DATABASES FOR APPLICATIONS ISSUING DDL AND DML STATEMENTS," filed on Jul. 19, 1999, by Daniel M. DeKimpe et al.,; and Application Ser. No. 09/356,644, now U.S. Pat. No. 6,453,322 issued Sep. 17, 2002, entitled "EXTENSION OF DATA DEFINITION LANGUAGE (DDL) CAPABILITIES FOR RELATIONAL DATABASES FOR APPLICATIONS ISSUING MULTIPLE UNITS OF WORK," filed on Jul. 19, 1999, by Daniel M. DeKimpe et al.,;

which are incorporated by reference herein.

BACKGROUND OF THE INVENTION

1. Field of the Invention

This invention relates in general to database management systems performed by computers, and in particular, to improving multi-dimensional restructure performance by selecting a technique to modify a relational database based on a type of restructure.

2. Description of Related Art

Relational DataBase Management System (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

RDBMS software has typically been used with databases comprised of traditional data types that are easily structured into tables. However, RDBMS products do have limitations with respect to providing users with specific views of data. Thus, "front-ends" have been developed for RDBMS products so that data retrieved from the RDBMS can be aggregated, summarized, consolidated, summed, viewed, and analyzed. However, even these "front-ends" do not easily provide the ability to consolidate, view, and analyze data in the manner of "multi-dimensional data analysis." This type of functionality is also known as on-line analytical processing (OLAP).

OLAP generally comprises numerous, speculative "what-if" and/or "why" data model scenarios executed by a computer. Within these scenarios, the values of key variables or parameters are changed, often repeatedly, to reflect potential variances in measured data. Additional data is then synthesized through animation of the data model. This often includes the consolidation of projected and actual data according to more than one consolidation path or dimension.

Data consolidation is the process of synthesizing data into essential knowledge. The highest level in a data consolidation path is referred to as that data's dimension. A given data dimension represents a specific perspective of the data included in its associated consolidation path. There are typically a number of different dimensions from which a given pool of data can be analyzed. This plural perspective, or Multi-Dimensional Conceptual View, appears to be the way most business persons naturally view their enterprise. Each of these perspectives is considered to be a complementary data dimension. Simultaneous analysis of multiple data dimensions is referred to as multi-dimensional data analysis.

OLAP functionality is characterized by dynamic multi-dimensional analysis of consolidated data supporting end user analytical and navigational activities including:

- calculations and modeling applied across dimensions, through hierarchies and/or across members;
- trend analysis over sequential time periods;
- slicing subsets for on-screen viewing;
- drill-down to deeper levels of consolidation;
- reach-through to underlying detail data; and
- rotation to new dimensional comparisons in the viewing area.

OLAP is often implemented in a multi-user client/server mode and attempts to offer consistently rapid response to database access, regardless of database size and complexity. While some vendors have proposed and offered OLAP systems that use RDBMS products as storage managers, to date these offerings have been unsuccessful for a variety of reasons.

A multi-dimensional OLAP system has multiple dimensions and members within the dimensions. A key table holds data for the multi-dimensional OLAP system. If the dimensions are changed, data in the key table needs to be updated accordingly. In particular, an entire key table may need to be rebuilt. If the key table is large, performance may be slow because of the volume of data being updated in the key table and because the database manager logs each of these changes. Additionally, the database manager may run out of log space. That is, some database managers have an upper limit to the size of the transaction log file. If enough rows are deleted this maximum log file size will be reached.

Thus, there is a need in the art for efficiently updating a key table during outline restructure of a multi-dimensional database.

SUMMARY OF THE INVENTION

To overcome the limitations in the prior art described above, and to overcome other limitations that will become apparent upon reading and understanding the present specification, the present invention discloses a method, apparatus, and article of manufacture for efficiently updating a key table during outline restructure of a multi-dimensional database.

According to an embodiment of the invention, a command is executed in a computer to perform a database operation on a relational database stored on a data store connected to the computer. It is determined that a multi-dimensional database has been restructured. Then, a key table of the relational database is rebuilt to correspond to the restructured multidimensional database.

BRIEF DESCRIPTION OF THE DRAWINGS

Referring now to the drawings in which like reference numbers represent corresponding parts throughout.

DETAILED DESCRIPTION OF A PREFERRED EMBODIMENT

Figure 1:
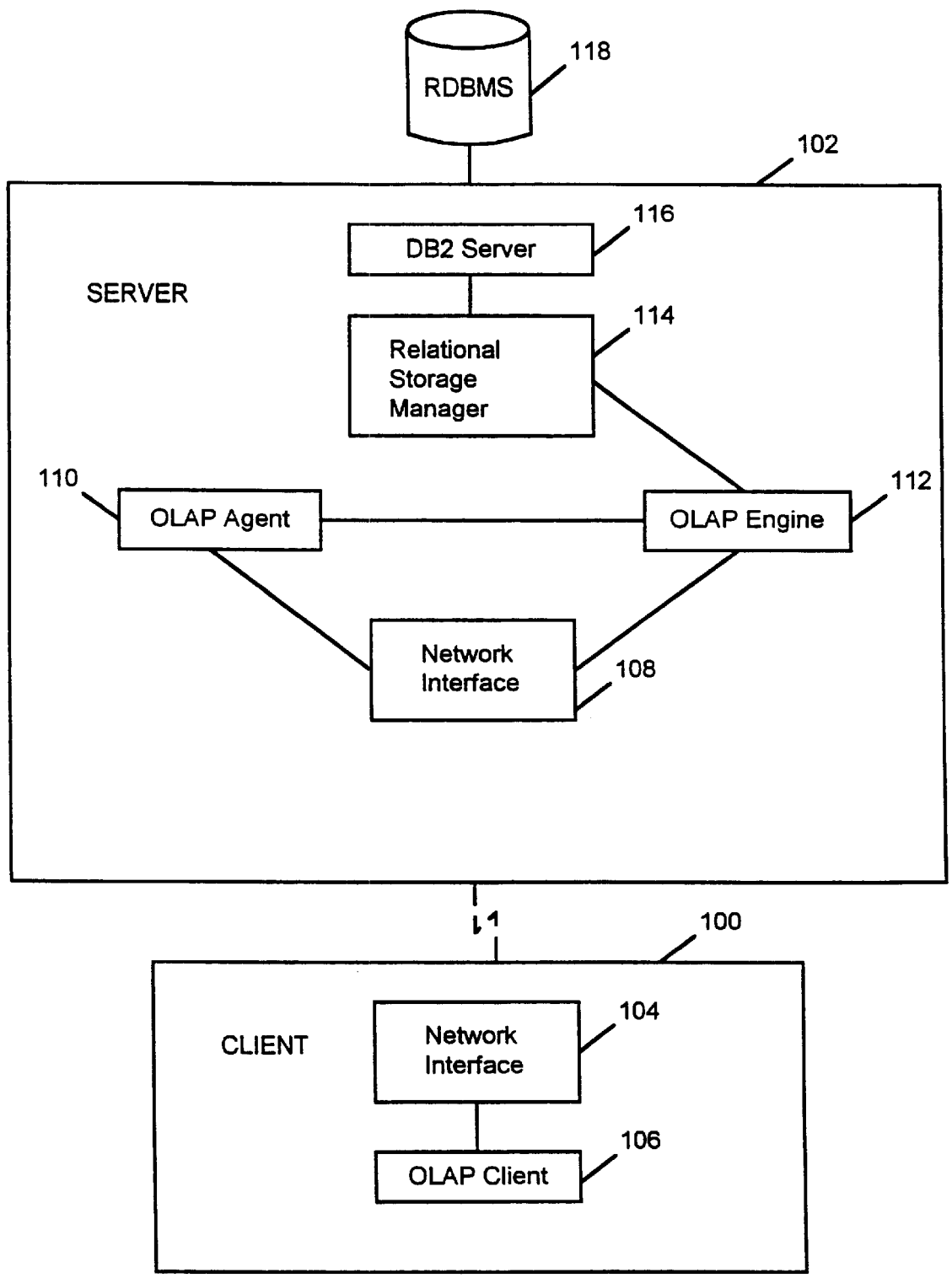
FIG. 1 is a block diagram illustrating a hardware environment used to implement a preferred embodiment of the present invention.

In the following description of a preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises an OLAP system that is designed for a wide-range of multi-dimensional reporting and analysis applications. The OLAP system is based both on Hyperion Software's Essbase OLAP software and IBM's DB2 RDBMS software. The present invention utilizes a number of components from Hyperion Software's Essbase OLAP system, including components that provide data access, navigation, application design and management and data calculation. However, the present invention comprises new elements that perform database operations, such as storing and retrieving data, for the OLAP system in a relational database. The present invention replaces the integrated multi-dimensional data storage manager of Hyperion Software's Essbase OLAP software with a relational storage manager based on IBM's DB2 RDBMS software. The relational storage manager enables the OLAP system to store data directly into a relational database.

The relational database utilized by the present invention provides the capacity of industry leading relational databases, and can be managed by familiar RDBMS systems management, backup, and recovery tools. It also offers the advantage of providing access to data using standard SQL (Structured Query Language). In addition, the present invention is designed for applications with very large data volumes. Further, the present invention leverages the existing RDBMS skills of information technology professionals.

The present invention differs from prior art ROLAP (Relational-OLAP) products in significant ways. Prior art ROLAP products, for example, are unsuited for applications which require complex calculations, read/write support, or high numbers of concurrent users. In addition, prior art ROLAP products require extensive support staffs or consultants to develop and deploy applications.

The present invention does not share any of these limitations. Because it integrates Hyperion Software's Essbase OLAP software with IBM's DB2 RDBMS software, the present invention provides simplified application design, robust calculation capabilities, and flexible data access coupled with scalability of user access. Significant advantages of the present invention over ROLAP include: performance; automatic table, index and summary management; robust analytical calculations; multi-user read and write access; and security.

With regard to performance, the present invention is designed to deliver consistent, fast response measured in seconds regardless of database size. Prior art ROLAP products measure response time in tens of seconds, minutes or hours.

With regard to automatic table, index and summary management, the present invention automatically creates and manages tables and indices within a star schema in the relational database. The present invention can also populate the star schema with calculated data. Prior art ROLAP products require teams of database architects to manage hundreds or thousands of summary tables manually in order to deliver acceptable end-user performance.

With regard to robust analytical calculations, the present invention is designed to perform high-speed data aggregations (revenue by week, month, quarter and year), matrix calculations (percentages of totals), cross-dimensional calculations (market share and product share) and procedural calculations (allocations, forecasting). Prior art ROLAP products provide less robust calculation capabilities.

With regard to multi-user read and write access, the present invention is designed to support multi-user read and write access which enables operational OLAP applications such as budgeting, planning, forecasting, modeling, "what-ifing" etc. On the other hand, prior art ROLAP products are read-only.

With regard to security, the present invention is designed to deliver robust data security down to the individual data cell level. Prior art ROLAP products provide no security, or only limited application level security.

The capabilities of the present invention are the same as those of Hyperion Software's Essbase OLAP software, including sophisticated OLAP calculations, comprehensive OLAP navigation features, complex database access support and multi-user read/write functionality. In addition, front-end tools, system management tools and applications from Hyperion Software and leading third parties will also work with the present invention. Consulting and education companies that have developed expertise with Hyperion Software's Essbase OLAP software can immediately apply their experience and knowledge to the present invention.

Although the present specification describes the use of IBM's DB2 RDBMS software, those skilled in the art will recognize that the present invention can use DB2, Oracle, Informix, Sybase, or other RDBMS software, and can run on computers using IBM OS/2, Microsoft Windows NT, IBM-AIX, Hewlett-Packard HP-UX, Sun Solaris, and other operating systems.

Hardware Environment

FIG. 1 is a block diagram illustrating a hardware environment used to implement the preferred embodiment of the present invention. In the hardware environment, a client/server architecture is illustrated comprising an OLAP client computer 100 coupled to an OLAP server computer 102. In the hardware environment, the OLAP client 100 and OLAP server 102 may each include, inter alia, a processor, memory, keyboard, or display, and may be connected locally or remotely to fixed and/or removable data storage devices and/or data communications devices. Each of the computers 100 and 102 also could be connected to other computer systems via the data communications devices. Those skilled in the art will recognize that any combination of the above components, or any number of different components, peripherals, and other devices, may be used with the computers 100 and 102. Those skilled in the art will also recognize that the present invention may be implemented on a single computer, rather than multiple computers networked together.

The present invention is typically implemented using one or more computer programs, each of which executes under the control of an operating system, such as OS/2, Windows, DOS, AIX, UNIX, MVS, etc., and causes the computers 100 and 102 to perform the desired functions as described herein. Thus, using the present specification, the invention may be implemented as a machine, process, or article of manufacture by using standard programming and/or engineering techniques to produce software, firmware, hardware or any combination thereof Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the computers 100 and 102, cause the computers 100 and 102 to perform the steps necessary to implement and/or use the present invention. Under control of the operating system, the computer programs may be loaded from the memory, data storage devices, and/or data communications devices into the memories of the computers 100 and 102 for use during actual operations. Those skilled in the art will recognize many modifications may be made to this configuration without departing from the scope of the present invention.

In the example illustrated in FIG. 1, the present invention includes a network interface program 104 and an OLAP client program 106 executed by the OLAP client 100, and a network interface program 108, an OLAP agent program 110, an OLAP engine program 112, a relational storage manager (RSM) program 114, and a DB2 server program 116 executed by the OLAP server 102. The DB2 server program 116, in turn, performs various database operations, including search and retrieval operations, termed queries, insert operations, update operations, and delete operations, against one or more relational databases 118 stored on a remote or local data storage device.

The present invention utilizes a number of components from Hyperion Software's Essbase OLAP system, including the network interface 104, OLAP client 106, network interface 108, OLAP agent 110, and OLAP engine 112. These components provide data access, navigation, application design and management and data calculation. However, the relational storage manager 114 and DB2 server 116 comprise new elements that access (e.g., store and retrieve) data for the OLAP system in a relational database.

Those skilled in the art will recognize that the hardware environment illustrated in FIG. 1 is not intended to limit the present invention. Indeed, those skilled in the art will recognize that other alternative hardware environments may be used without departing from the scope of the present invention.

Conceptual Structure of the Multi-dimensional Database

Figure 2:
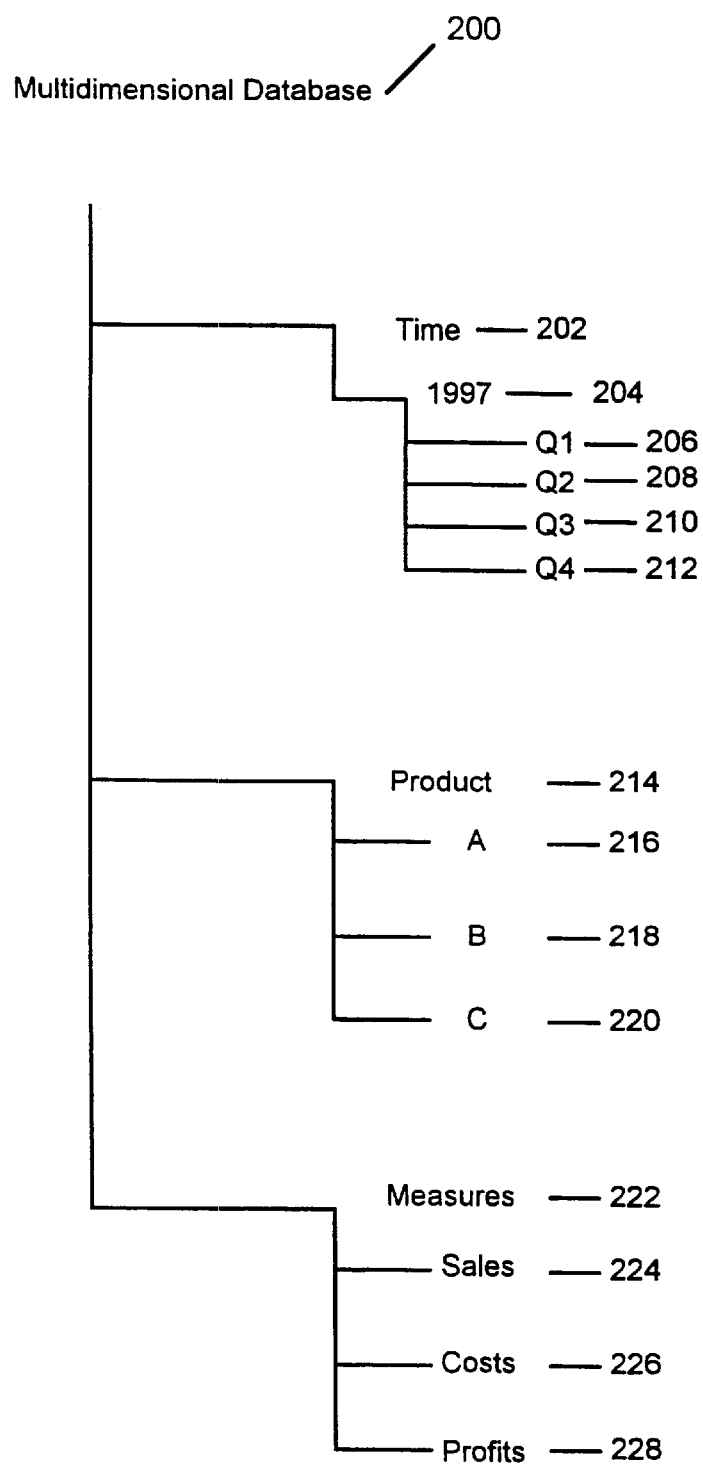
FIG. 2 is a diagram that illustrates the conceptual structure (i.e., an outline) of a multi-dimensional database according to the present invention.

FIG. 2 is a diagram that illustrates the conceptual structure (i.e., an outline) of a multi-dimensional database 200 according to the present invention. A dimension 202, 214, or 222 is a structural attribute that is a list of members, all of which are of a similar type in the user's perception of the data. For example, the year 1997 204 and all quarters, Q1 206, Q2 208, Q3 210, and Q4 212, are members of the Time dimension 202. Moreover, each dimension 202, 214, or 222 is itself considered a member of the multi-dimensional database 200.

Logical Structure of the Multi-dimensional Database

Figure 3:
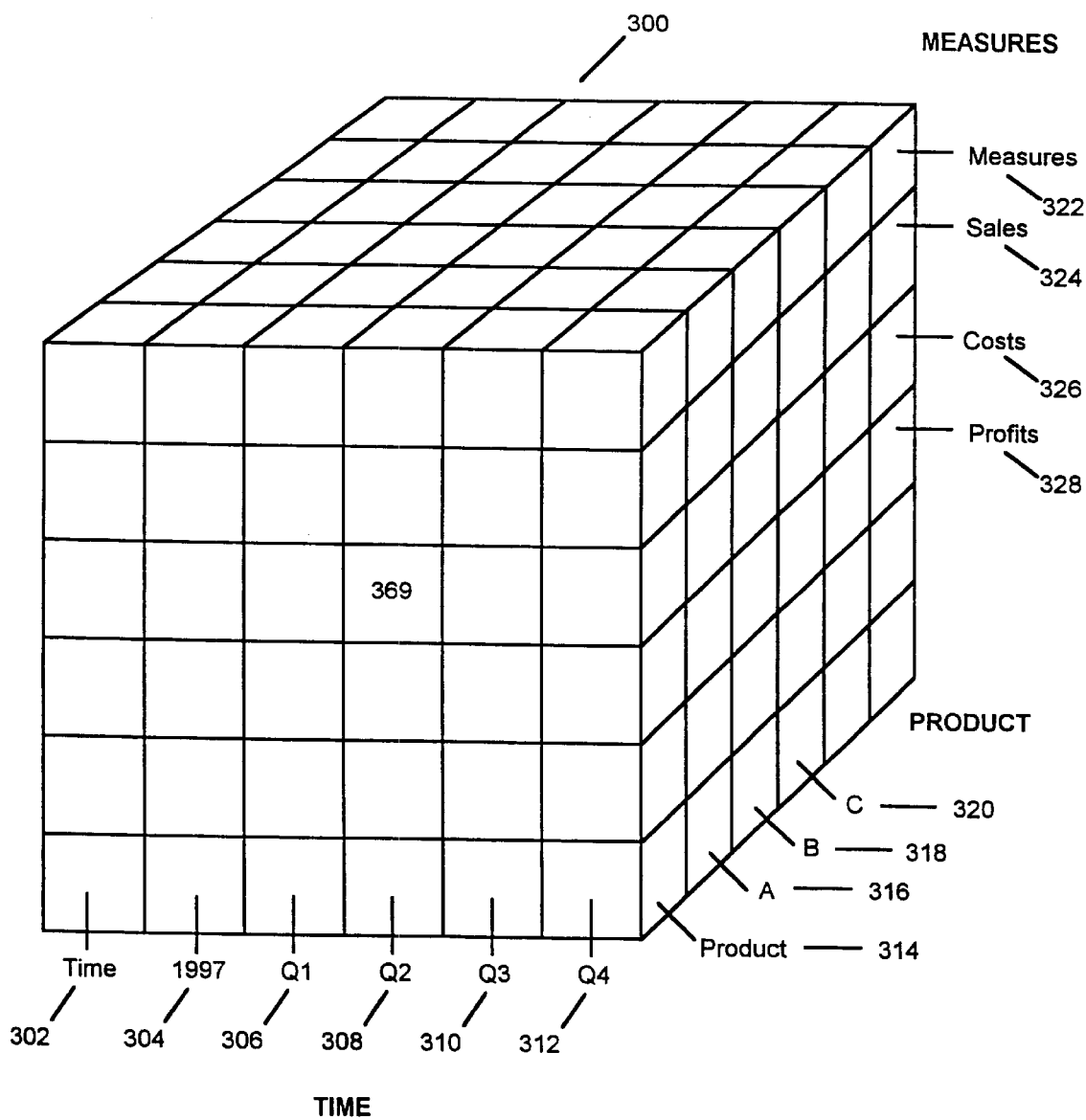
FIG. 3 is a diagram that illustrates the logical structure of a multi-dimensional database according to the present invention.

FIG. 3 is a diagram that illustrates the logical structure of a multi-dimensional database 300 according to the present invention. Generally, the multi-dimensional database 300 is arranged as a multi-dimensional array, so that every data item is located and accessed based on the intersection of the members which define that item. The array comprises a group of data cells arranged by the dimensions of the data. For example, a spreadsheet exemplifies a two-dimensional array with the data cells arranged in rows and columns, each being a dimension. A three-dimensional array can be visualized as a cube with each dimension forming an edge. Higher dimensional arrays (also known as Cubes or Hypercubes) have no physical metaphor, but they organize the data in a way desired by the users.

A dimension acts as an index for identifying values within the Cube. If one member of the dimension is selected, then the remaining dimensions in which a range of members (or all members) are selected defines a sub-cube in which the number of dimensions is reduced by one. If all but two dimensions have a single member selected, the remaining two dimensions define a spreadsheet (or a "slice" or a "page"). If all dimensions have a single member selected, then a single cell is defined. Dimensions offer a very concise, intuitive way of organizing and selecting data for retrieval, exploration and analysis.

A single data point or cell occurs at the intersection defined by selecting one member from each dimension in a cube. In the example cube shown in FIG. 3, the dimensions are Time, Product, and Measures. The cube is three dimensional, with each dimension (i.e., Time, Product, and Measures) represented by an axis of the cube. The intersection of the dimension members (i.e., Time 302, 1997 304, Q1 306, Q2 308, Q3 310, Q4 312, Product 314, A 316, B 318, C 320, Measures 322, Sales 324, Costs 326, and Profits 328) are represented by cells in the multi-dimensional database that specify a precise intersection along all dimensions that uniquely identifies a single data point. For example, the intersection of Q2 308, Product 314 and Costs 326 contains the value, 369, representing the costs of all products in the second quarter of 1997.

Cubes generally have hierarchies or formula-based relationships of data within each dimension. Consolidation involves computing all of these data relationships for one or more dimensions. An example of consolidation is adding up all sales in the first quarter. While such relationships are normally summations, any type of computational relationship or formula might be defined.

Members of a dimension are included in a calculation to produce a consolidated total for a parent member. Children may themselves be consolidated levels, which requires that they have children. A member may be a child for more than one parent, and a child's multiple parents may not necessarily be at the same hierarchical level, thereby allowing complex, multiple hierarchical aggregations within any dimension.

Drilling down or up is a specific analytical technique whereby the user navigates among levels of data ranging from the most summarized (up) to the most detailed (down). The drilling paths may be defined by the hierarchies within dimensions or other relationships that may be dynamic within or between dimensions. For example, when viewing data for Sales 324 for the year 1997 304 in FIG. 3, a drill-down operation in the Time dimension 302 would then display members Q1 306, Q2 308, Q3 310, and Q4 312.

Relational Database Structure

Figure 4:
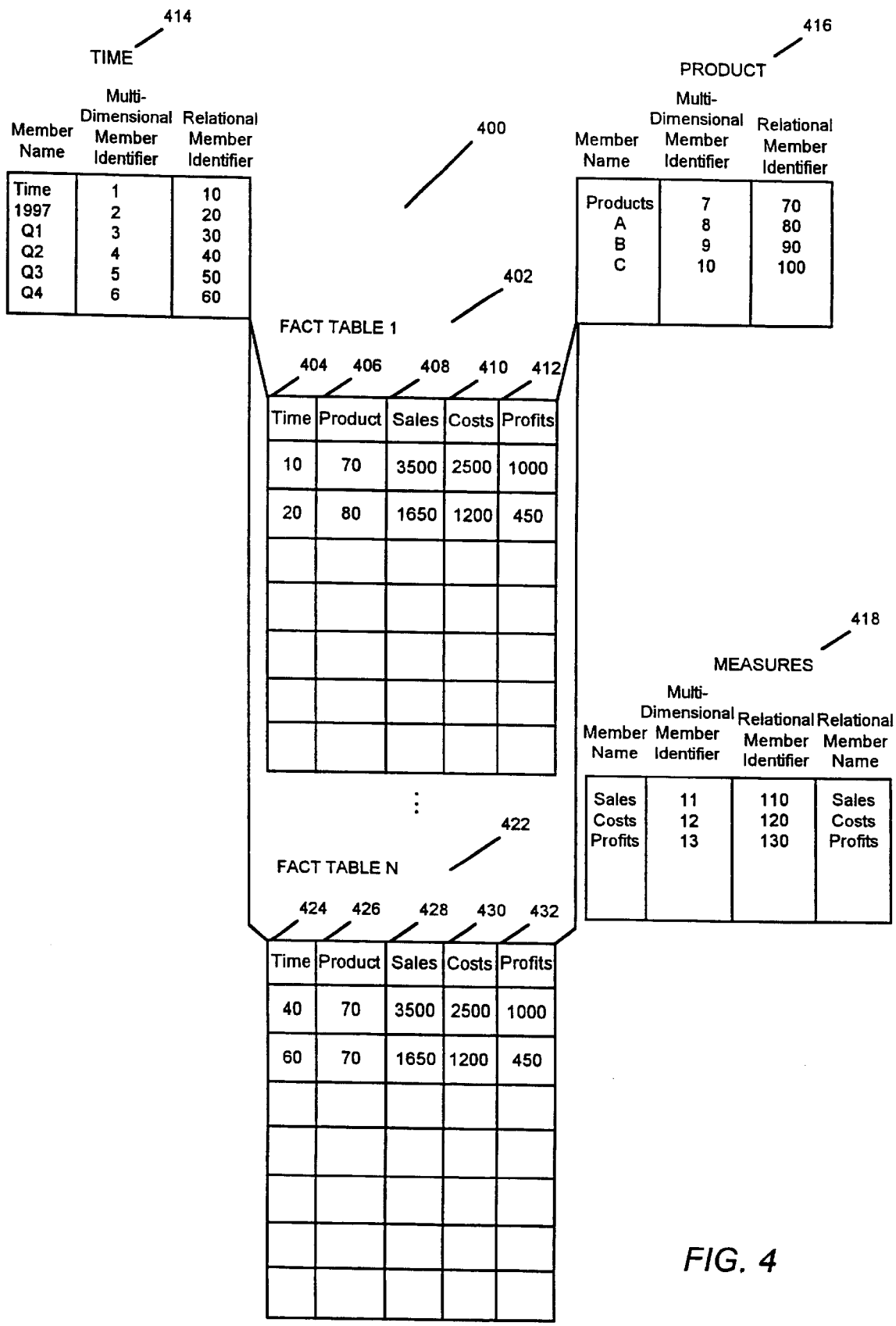
FIG. 4 is a diagram that illustrates a structure for storing multi-dimensional data in a relational database structure according to the present invention.

FIG. 4 is a diagram that illustrates a structure for storing multi-dimensional data in a relational database structure according to the present invention. The present invention stores data in a star schema 400 in the relational database 118, as opposed to a specialized multi-dimensional data store as described in the '724 patent. However, in order to work correctly with Hyperion Software's Essbase OLAP software, the relational storage manager 114 and DB2 server 116 of the present invention work together to emulate the structure and functions performed in the '724 patent, even though a different database is used to store the multi-dimensional data.

In the present invention, the multi-dimensional data is stored in a star schema 400 in the relational database 118. A star schema 400 is a set of relational tables including multiple main tables 402 through 422 and related dimension tables 414, 416, and 418, wherein the dimension tables 414 and 416 intersect the main tables 402 through 422 via common columns, and wherein the dimension table 418 has a column in the main tables 402 through 422 corresponding to each of its rows. The preferred embodiment of the present invention provides a view of multiple partitions as a single table. In particular, the term "partition" as used herein does not necessarily refer to partitions as defined by a standard relational database system, but, instead, refers to the partitioning of data across individual main tables as used by the preferred embodiment of the present invention. A star schema 400 has several benefits over storing information in traditional RDBMS tables used for on-line transaction processing (OLTP).

Because a star schema 400 is simple, having few tables, it minimizes the complexity required to process database operations. This helps both to speed performance and to ensure correct results of database operations.

Moreover, the use of a star schema 400 is a well known, standard model, and many relational databases 118 have built in optimization for it. By adhering to this standard model, the present invention automatically takes advantage of any such optimization.

In the example of FIG. 4, the boxes and ellipses represent fact tables 402 through 422 and dimension tables 414, 416, and 418. The connections between the boxes 402 through 422 and 414 and 416 represent star joins between tables. The fact tables 402 through 422 are also known as fact tables. The star schema 400 thus comprises fact tables 402 through 422, which are joined to one or more dimension tables, TIME 414 and PRODUCT 416, according to specified relational or conditional operations. The fact tables 402 through 422 hold data values, while the dimension tables TIME 414, PRODUCT 416, and MEASURES 418 hold member information. As a result, the dimension tables 414, 416, and 418 are relatively small, and the fact tables 402 through 422 are usually very large.

The dimension tables TIME 414 and PRODUCT 416 are usually joined to the fact tables 402 through 422 with an equivalence condition. In this example of a star schema 400, there are no join conditions between the dimension tables TIME 414, PRODUCT 416, and MEASURES 418 themselves.

In the preferred embodiment, one dimension, called an "Anchor" dimension, is treated differently from the other dimensions, called "non-anchor" dimensions, in that all of its members are mapped to columns in the fact tables 402 through 422. For example, in FIG. 4, the MEASURES dimension 418 is the anchor dimension. There is one column in each fact table 402 through 422 (i.e., SALES 408 and 428, COSTS 410 and 430, and PROFITS 412 and 432) for each member, Sales, Costs, and Profits, of the MEASURES dimension 418. The fact tables 402 through 422 also contain one column, TIME 404 and 424 and PRODUCT 406 and 426, for each other non-anchor dimension, TIME 414 and PRODUCT 416.

Although there are multiple fact tables illustrated in FIG. 4, one skilled in the art would recognize that the techniques of the present invention may also be applied to a single fact table.

Fact Table

In the preferred embodiment of the present invention, there are N fact tables for each Cube (e.g., FACT TABLE-1 and FACT TABLE-N, along with the ellipses in FIG. 4, illustrate multiple fact tables). The fact tables hold the actual data values of the Cube. In particular, each fact table holds a data block, which is a portion of the Cube. The fact tables 402 through 422 have a dimension column corresponding to each non-anchor dimension table 414 and 416. The dimension columns of the fact tables 402 through 422 hold relational member identifiers, and the non-anchor dimension tables 414 and 416 hold the mapping between those relational member identifiers and the member names and multi-dimensional member identifiers. The data values in the fact tables 402 through 422 are indexed by the relational member identifiers from each of the dimension columns.

For example, one row in the fact table 402 contains all data values for a unique combination of members from the different non-anchor dimension tables 414 and 416. Specifically, the dimension columns 404 and 406 contain relational member identifiers corresponding to the multi-dimensional member identifiers, and the member columns 408, 410, and 412 contain data values. For example, the first row in the example of FIG. 4, holds the Sales of 3500, Costs of 2500, and Profits of 1000 for every Product and all Times. Moreover, the second row, in the example of FIG. 4, holds the Sales of 1650, Costs of 1200, and Profits of 450 for Product A during the 1997 Time frame.

The fact tables 402 through 422 only hold rows for valid combinations of members from the non-anchor dimensions. So, for example, if a particular product is not sold in a year, there will be no sales, costs or profit figures for any time period for that product in that year. Consequently, the fact tables 402 through 422 would not hold any rows for these combinations.

Dimension Tables

As described above, there is one dimension table for each dimension defined in the Cube (i.e., based on the outline). The purpose of the dimension tables is to hold all information relevant to the members of a particular dimension.

Each dimension table contains one row for each member defined in the associated dimension. Note that the dimension name itself is considered to be a member since it represents the top level of the hierarchy for that dimension. The columns are as follows:

MemberName—This is the member name. It is the user-entered name for each member. The value of the MemberName is set to a NULL value if this member is deleted. When a RelMemberId is required, the RelMemberId corresponding to a MemberName which is a NULL value is reused.

RelMemberName—This is the relational member name. It is only used in the Anchor dimension table (because the members from this dimension map to columns in the fact table 402). This column therefore needs to contain valid relational column names. Therefore, this column may contain member names which have been modified from those stored in MemberName, if necessary.

RelMemberId—This is the relational member identifier. This contains an identifying number for each member used to access data in the relational database. This number is unique within the dimension table. This column is used to 'join' the dimension table to the fact table. Members always retain the same relational member identifier throughout their life time. A relational member identifier may be reused if a member is deleted and another member is created.

MemberId—This is the multi-dimensional member identifier. This contains an identifying number allocated to the member by Essbase. When a Cube definition is altered in Essbase and the Essbase database is restructured, this value may be changed by Essbase. This is a NULL value if MemberName is a NULL value.

The MemberName is typically obtained from the outline. The MemberId is assigned by Hyperion Software's Essbase OLAP software and is used by this software to access multi-dimensional data stored in dense data blocks in a multi-dimensional database 300. The RelMemberId is the common column between the non-anchor dimension tables 414 and 416 and the fact tables 402 through 422 that is used to join the tables 402, 414, and 416 and 422,414, and 416 and is used to access data in the relational database 118 (i.e., fact table 402). The MemberId, which is used internally by Hyperion Software's Essbase OLAP software, maps to the RelMemberId, which is used by the relational database 118 to access data.

Accessing Multi-dimensional Data

To access the multi-dimensional data in the relational database 118, a user interacts with the OLAP client program 106 executed by the OLAP client 100. This interaction results in a request (i.e., command) for a database operation being formed, which is transmitted to the OLAP agent 110 and/or OLAP engine 112 executed by the OLAP server 102 via the network interface programs 104 and 108. The OLAP agent 110 communicates with the OLAP engine 112, and the OLAP engine 112 executes functions via the relational storage manager 114 to access the multi-dimensional data from a data storage manager. In Hyperion Software's Essbase OLAP software, data is requested by specifying one or more sparse index keys (i.e., a sparse index key is an encoding of one member from each sparse dimension) that identify one or more dense data blocks in the multi-dimensional database 300.

In the present invention, these sparse index keys comprise combinations of one MemberId for each sparse dimension used internally in Hyperion Software's Essbase OLAP software. The relational storage manager 114 requests the OLAP Engine 112 to decompose the sparse index key into a list of MemberIds. The relational storage manager 114 maps the MemberIds to the RelMemberId used in the relational database 118 via the respective non-anchor dimension tables 414 and 416 in the relational database 118. Then, the RelMemberIds are used to access the respective non-anchor dimension tables 414 and 416 in the relational database 118. The resulting rows of the non-anchor dimension tables 414 and 416 are joined to corresponding rows in the fact tables 402 through 422.

As mentioned above, each fact table contains multiple data blocks. When the OLAP client program 106 submits, via the OLAP agent 110 and OLAP engine 112, a request to the relational database, the OLAP client program 106 reads or writes data from a single data block. Therefore, when the relational storage manager 114 maps MemberIds to RelMemberIds, the relational storage manager 114 also determines which one of the fact tables 402 through 422 contains the data corresponding to the data block to be accessed. Thus, only one of the fact tables 402 through 422 is accessed to respond to a request. The rows of the selected fact table 402 through 422, which thus meet the criteria of the sparse index keys, are returned by the DB2 server 116 to the relational storage manager 114.

The rows returned have RelMemberId followed by values for each of the members of the anchor dimension (e.g., the MEASURES dimension 418 in FIG. 4). The relational storage manager 114 then converts the RelMemberId into MemberIds and reformats the rows from the fact table 402 into a "dense data block". The reformatted rows are passed to the OLAP engine 112, which ultimately return the desired data to the OLAP client 106.

Another advantage of the embodiment of the invention is that the relational storage manager 114 defines a view of the fact tables as a single fact table. A user can write a customized application (i.e., a customer written application) to select information from the view. Thus, the customized application is not aware that the data has been partitioned among several tables. That is, to shield customized applications from this partitioning of the data, the relational storage manager 114 creates a view of the partitioned fact tables (i.e., UNIONed SELECTs) that appears to be and acts identically to a single fact table when queried (i.e., with SELECTs) Additionally, the customized application communicates directly with the DB2 Server 116 and does not need to communicate with the relational storage manager 114. To provide this view, the relational storage manager 114 SELECTS all of the rows from each of the fact tables and combines the rows using a UNION operation to form a view comprising a single fact table. Thus, the use of multiple fact tables is transparent.

In this manner, the relational database 118 can be used to emulate multi-dimensional data in a multi-dimensional database 300. Moreover, by converting between MemberIds of the sparse index keys and RelMemberId, the DB2 server 116 is able to treat the data in the relational database 118 as dense datablocks for Hyperion Software's Essbase OLAP software, while actually maintaining the data in a relational database 118.

In an alternative embodiment, the MemberIds and the RelMemberId are mapped to each other using two in-memory arrays. The array used to map MemberIds to RelMemberId has an element for each MemberId containing the corresponding RelMemberId. The array used to map RelMemberId to MemberIds has an element for each RelMemberId containing the corresponding MemberId. These arrays are generated after the outline is created, and they are re-constructed each time the relational storage manager 114 initializes or "opens" the multi-dimensional database and after each outline re-structure.

In Hyperion Software's Essbase model of a multi-dimensional database, the dense data blocks of the multi-dimensional database are ordered by the numerical values of their sparse index keys. In the present invention, the relational storage manager 114 maintains the ordering of the dense data blocks by storing the sparse index keys in a key table. The relational storage manager 114 holds also holds additional information about each dense data block in the key table. In particular, the information includes status information (e.g., usage information) and timestamps (e.g., age information).

Outline Modifications

When the outline is modified, the relational database 118 is modified. In particular, when an outline is changed, Hyperion Software's Essbase OLAP software may change the MemberIds for members defined in the outline. When this happens, the MemberIds in the dimension tables 414, 416, and 418 are updated accordingly. When a member is deleted from the outline, the corresponding row of the dimension table 414, 416, or 418 is marked as being available by updating the MemberId and the MemberName to be NULL values. Moreover, when a member is added to the outline, a RelMemberId is sought for the member. A RelMemberId in a table that is available is used (i.e., a RelMemberId corresponding to a MemberName having a NULL value). When no such RelMemberId is available, a new RelMemberId is generated for the newly added member.

Multi-threaded Architecture

The technique of the present invention can be applied to one or more fact tables. In particular, if the multi-dimensional database has multiple fact tables, then multiple threads (one per table) and multiple connections (one per table) are used to create and fill the new tables.

As discussed above with respect to FIG. 4, in one embodiment of the invention, the star schema comprises N fact tables joined to multiple dimension tables. Each fact table contains the data for multiple data blocks. Additionally, a key table contains information about the data blocks, including status information (e.g., usage information), timestamps (e.g., age information), and a block key (i.e., the sparse index key comprised of Member Ids). When a new multi-dimensional database is created, the relational storage manager 114 creates the N fact tables of the star schema. By creating N fact tables, the relational storage manager 114 is able to perform operations in parallel across the N fact tables and the separate key table, leading to more efficient database processing. In an alternative embodiment, the star schema may be comprised of one fact table, dimension tables, and a key table. In this scenario, the fact table and key table may be accessed in parallel, leading to more efficient processing.

In particular, the relational storage manager 114 uses concurrent threads with separate database connections when performing input/output (I/O) operations (e.g., INSERT). The applications (e.g., the OLAP client program 106) submit different requests, each on a separate thread. Initially, the relational storage manager 114 generates a single thread with a single connection to the relational database for each session started by the OLAP engine 112. The OLAP engine 112 starts a session for each application that submits requests to the OLAP engine 112. For example, if four applications submit requests to the OLAP engine 112, then the relational storage manager 114 generates four separate threads, each with a different connection.

Initially, if the relational storage manager receives a request that requires only reading data, the relational storage manager 114 uses the single thread to read the data in the fact tables and the key table. When the relational storage manager 114 receives a request that requires writing data, the relational storage manager 114 generates multiple threads, one for each fact table and key table, with multiple connections, one for each fact table and key table.

A connection is a relational database concept that refers to enabling an application to submit requests to the relational database. A thread is an operating system concept in which apart of a program can execute independently from other parts. Operating systems that support multithreading enable programmers to design programs whose threaded parts can execute concurrently.

In order to provide concurrent operations, the relational storage manager 114 uses N independent threads to access the N fact tables and another thread to access the key table. Each thread maintains an RDBMS connection with exactly one of the tables (i.e., the fact tables and key table). This allows the relational storage manager 114 to write multiple blocks concurrently.

The relational storage manager 114 uses a hashing function (i.e., a partitioning function) based on dimension identifiers to determine the fact table in which rows are to be stored. In this invention, the hashing function is added to the WHERE clause of the INSERT statement used to copy rows to the new fact tables.

Figure 5:
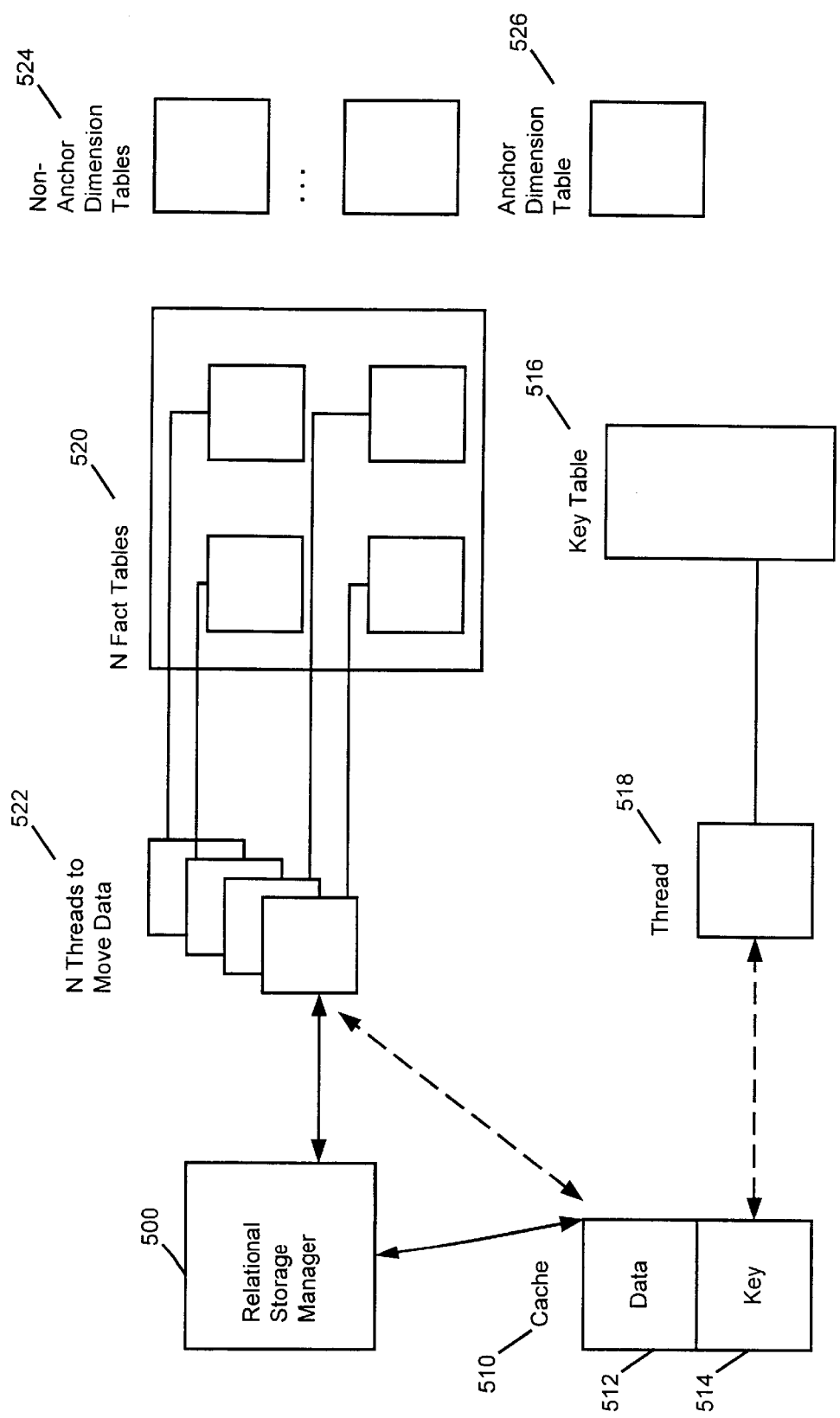
FIG. 5 is a block diagram illustrating improved performance of table insertion by using multiple tables or multiple threads.

FIG. 5 is a block diagram illustrating table insertion by using multiple tables or multiple threads. In the following example, the OLAP client 106 writing (i.e., copying or inserting) data into the fact tables 520. As shown in FIG. 5, the relational storage manager 500 maintains a cache 510 in memory. Additionally, fact tables 520, non-anchor dimension tables 524, anchor dimension table 526, and key table 516 are stored in persistent storage.

When data is to be written, initially, a data block and its sparse index key are presented to the relational storage manager 500 by a multi-dimensional database calculation engine (MDCE) (which is part of the OLAP engine 112) for writing to persistent storage. The MDCE accesses a single data block at a time for a transaction, with a data block corresponding to data in one fact table. Note that the MDCE actually receives multiple requests from different applications. The MDCE uses a separate thread for each request when communicating with the relational storage manager 500. However, when the MDCE requests data for an application, the MDCE pauses processing for that application until the data is received. After receiving a request from the MDCE, the relational storage manager 500 copies the requested data to a memory-resident cache 510 and returns control to the MDCE.

The cache 510 holds fact table data 512 and key table information 514. The data 512 includes data retrieved from the fact tables 520 in response to a request for data from the OLAP client 106, and this data is returned by the relational storage manager 500 to the OLAP engine 112, which returns the data to the OLAP client 106. Additionally, the data 512 may include data to be written to the fact tables 520.

The key table information 514 includes entries, with each entry containing status information (e.g., usage information), timestamps (e.g., age information), and a block key (i.e., the sparse index key comprised of Member Ids). The block key is a sparse index key, which comprises a combination of one MemberId for each sparse dimension used internally in the Essbase OLAP software.

After the MDCE submits a request to commit data (i.e., to copy data from the cache to the relational database), or when a predetermined amount of data for the fact tables has been written to the cache (i.e., there are "dirty" or modified data blocks in the cache), a group of data blocks is selected to be written to the fact tables 520. A hashing function is used to determine which rows corresponding to the data blocks are to be in which of the N fact tables. The set of sparse dimension identifiers (i.e., MemberIds) used in a hashing function can be derived from the sparse index key that identifies a data block. The hashing function maps the MemberIds of the sparse index key to RelMemberId, adds the RelMemberId, and mods by N. This allows each of the N threads 522 that move data to and from the fact tables 520 to determine which rows it is responsible for writing to its corresponding fact table 520. Additionally, the thread 518 is used to manipulate key table 516 entries corresponding to the rows in parallel with the N threads 522. Thus data is written into the relational database concurrently using N threads 522 and thread 518.

That is, when the MDCE specifies that a transaction is to be committed, all cache data that has not been written to one of the fact tables 520 is then written to the appropriate fact tables 520 the key table 516, and the RDBMS 118 is instructed to commit all data it has received. Similarly, when there are a predetermined number of "dirty" data blocks in the cache, they are written to the appropriate fact tables 520 and the key table 516.

This allocation of multiple threads, each having a separate database connection, for each fact table and the key table ensures that the fact tables and the key table of the relational storage manager 500 star schema can be modified concurrently without causing RDBMS 118 deadlocks.

The relational storage manager may create N new fact tables and copy the data in the original fact tables among the new fact tables. The relational storage manager does this using N concurrent threads and connections and one for each new fact table.

Figure 6:
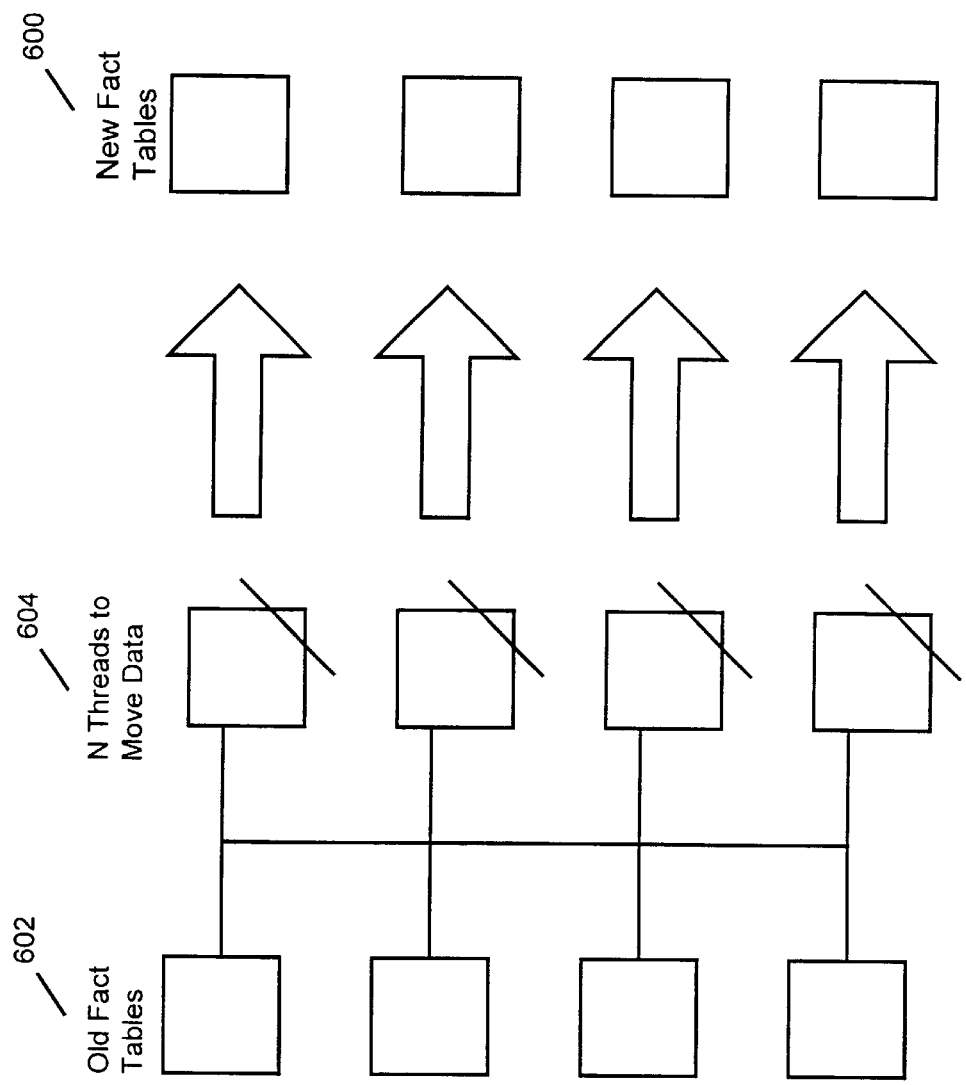
FIG. 6 is a block diagram illustrating the relational storage manager using N threads to redistribute data among N fact tables.

FIG. 6 is a block diagram illustrating the relational storage manager 114 using N threads to redistribute data among N fact tables. The relational storage manager 114 creates N new fact tables 600 and then copies the data of the original fact tables 602 into the new fact tables 600. In particular, the relational storage manager starts N threads 604 concurrently to perform the redistribution. Each of the N threads 604 stores data into one new fact table 600. Also, each of the threads may retrieve data from each of the fact tables 602. In particular, each thread recognizes the rows that should be stored into its corresponding new fact table 600. Therefore, each thread 604 retrieves these rows from the original fact tables 602 for storage into the corresponding new fact table 600.

In one embodiment, the data is moved using an INSERT with a subselect clause. This type of INSERT enables moves between two tables and avoids the need to retrieve data from an original fact table, store the data in an application's memory, and move the data from memory into a new fact table. Then, each of the N threads performs N INSERT statements with a subselect clause against each of the original fact tables. The subselect clause retrieves the appropriate rows from each of the original fact tables; while the INSERT inserts these rows into the new fact table corresponding to that thread.

Finally, if there are multiple fact tables, rows may need to be rearranged within the fact tables using a hashing technique to determine which fact table a particular row belongs to. If this is the case, rows can be moved from one original fact table to the appropriate new fact table by building an expression which represents the hashing technique in the WHERE clause of the SELECT INTO statement used to move rows from the original fact tables to the new.

Efficiently Updating a Key Table During Outline Restructure of a Multi-dimensional Database A preferred embodiment of the invention provides a relational storage manager 114 that efficiently updates the key table during outline restructure of the multi-dimensional database. The invention improves performance of certain complex restructure operations and reduces the chance of restructure failure that occurs when database log space is exhausted.

For a multi-dimensional database, there are several scenarios in which an outline restructure requires rebuilding the key table. For example, if PRODUCT and MEASURES are dense dimensions, then all data blocks in the multi-dimensional database contain grids indexed by PRODUCT and MEASURES. However, if PRODUCT is made into a sparse dimension, then all data blocks in the multi-dimensional database contain vectors indexed by MEASURES. This requires rebuilding the key table.

Data in an OLAP Server 116 multi-dimensional cube is grouped into blocks. In addition to the block data, each block has:

1. a unique block key,
2. an associated attribute value called KeyDataInfo,
3. a date value, and
4. a time value.

The DB2 Server 116 stores block keys, key data information (i.e., KeyDataInfo), and date and time information in the key table. The key table has exactly one row for each block and has four columns: BLOCKKEY, KEYDATAINFO, TIME1, and TIME2. The BLOCKKEY attribute is a sparse index key, which comprises a combination of one MemberId for each sparse dimension used internally in the multi-dimensional database. The KEYDATAINFO attribute stores flags, including a flag indicating whether a block has input values or requires that certain values be calculated. The TIME1 attribute stores seconds from a reference date, which enables calculating a current date. The TIME2 attribute stores microseconds.

There is a unique index on the BLOCKKEY column to improve block lookup performance and to prevent rows with duplicate block keys from being inserted.

During some complex restructures, when there is data in the multi-dimensional database, the key table has to be reorganized. During these restructures the number of blocks may increase, decrease, or stay the same. For example, an old block may become part of multiple new blocks. Alternatively, part, or all, of several old blocks may become a single new block. At the end of the restructure, each new block's KeyDataInfo value should be an aggregation of all the KeyDataInfo values from all blocks which comprise the new block. Additionally, the aggregation sets the time data for each block to be the same.

The following discussion will focus on three embodiments of the invention. For each embodiment, the following terminology will be used. The "old" key table to be rebuilt will be called key table KEYA, the "new" key table to built will be called key table KEYB. The rows or blocks or columns of key table KEYA will be referred to as "old" rows or blocks or columns, while the rows or blocks or columns of key table KEYB will be referred to as "new" rows or a blocks or columns.

First Technique

An embodiment of the invention provides a first technique for rebuilding a key table. In the first technique, the relational storage manager 114 rebuilds key table KEYA by the following process:

1. Create a new, empty key table KEYB.
2. Loop through each row (corresponding to a block) in the old key table KEYA.
    2a. Pass the block key attribute in the current row to a function in the OLAP engine 112. This function returns a table NEWKEYS with two columns. One column holds new block keys, referred to as unprocessed block keys, and the other column holds corresponding KeyDataInfo values.
    2b. Loop through each row in the table NEWKEYS.
        2bi. For the current row in the table NEWKEYS, attempt to insert a new row into the new key table KEYB. For the new row, the block key and KeyDataInfo values are obtained from the current row of the NEWKEYS table, while the TIME1 and TIME2 values are a constant value associated with the restructure time.
        2bii. If the attempt is successful, continue processing at Step 2b.
        2biii. If the attempt is unsuccessful (i.e., they are duplicates), receive an indication that the insertion is rejected because of the existence of the unique index on the BLOCKKEY column.
        2biv. Issue SELECT to read existing row from table KEYB.
        2bv. Aggregate the KeyDataInfo values for the current row of table NEWKEYS and the current row selected from key table KEYB to generate an aggregated result, determine whether the KeyDataInfo value for key table KEYB and the aggregated result are equal, and, if so, update the selected row of key table KEYB with the aggregated result.
3. Drop the old key table KEYA.

In summary, for each row in key table KEYA, the relational storage manager 114 receives from the OLAP engine 112 information on which rows are to be put into the new key table KEYB. When inserting a row into key table KEYB would cause a duplicate row, the relational storage manager 114 updates the existing row based on a new KeyDataInfo value from the OLAP engine 112. For further optimization, when a duplicate is detected, the row in key table KEYB need not be updated if the KeyDataInfo value from the engine is the same as the KeyDataInfo value already in the row.

A sample SQL statement to read all of the keys of table KEYA (Step 2) is as follows: SELECT KEYDATAINFO, BLOCKKEY FROM KEYA, which returns a set of rows that drives the outer loop in the technique described above.

From each row in table KEYA, the OLAP engine 112 produces a table NEWKEYS of derived block key and KeyDataInfo pairs. For each row of table NEWKEYS, a row is constructed to be inserted into table KEYB. If the insertion is successful, the next value in table NEWKEYS is processed. Otherwise, an SQL SELECT is required to read the KeyDataInfo value from the conflicting row already in table KEYB. The two KeyDataInfo values are aggregated. If the result is different from the value in the selected row of table KEYB, that row's KeyDataInfo value is updated with the aggregated KeyDataInfo values by an SQL UPDATE.

The following is an example INSERT statement that may be used to insert data into the new key table KEYB (Step 2bi): INSERT INTO KEYB (KEYDATAINFO, BLOCKKEY, TIME1, TIME2) VALUES (?, ?, 200, 300). For the example, the values for TIME1 and TIME2 are the same for all rows inserted and have been selected as 200 and 300 for illustration only. The following CLI APIs are then used to prepare and bind the columns for array insert:

SQLAllocStmt( )
SQLPrepare( )
SQLNumResultCols( )//returns 4 columns
SQLBindCol( )//called 4 times
SQLBindParameter( )//called twice for KEYDATAINFO and BLOCKKEY The following sample SQL statement is used in Step 2biv: SELECT KEYDATAINFO FROM KEYB WHERE BLOCKKEY=?. Note that the question mark, "?", represents a token that is replaced by data. Then the KEYDATAINFO column value received from the SELECT is merged with the new block's KEYDATAINFO. If necessary, the row is updated as in Step 2bv using the following sample SQL statement: UPDATE KEYB SET KEYDATAINFO=? WHERE BLOCKKEY=?.

Figure 7A:
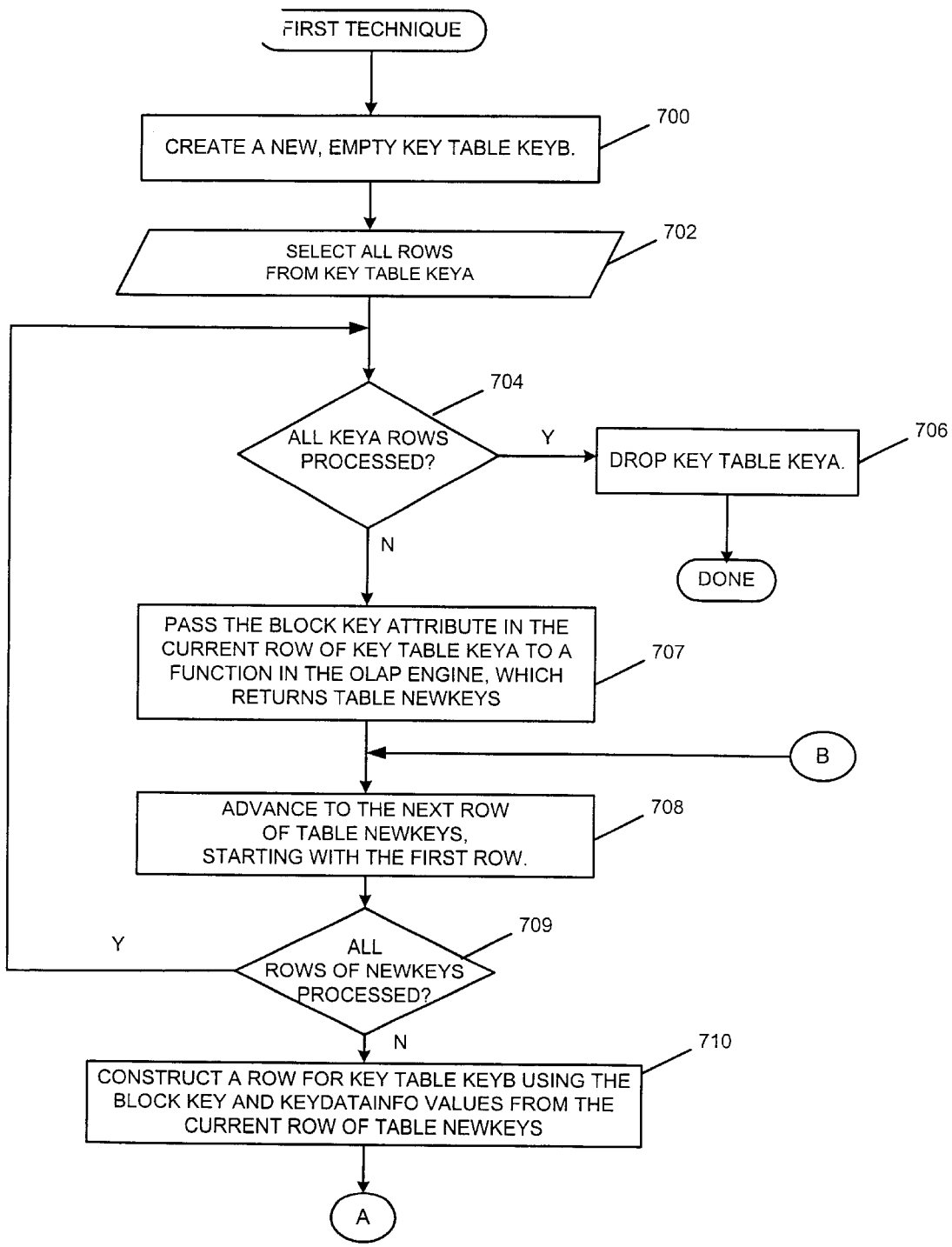
FIGS. 7A–7B are a flow diagram illustrating the process performed by the relational storage manager to perform the first technique.
Figure 7B:
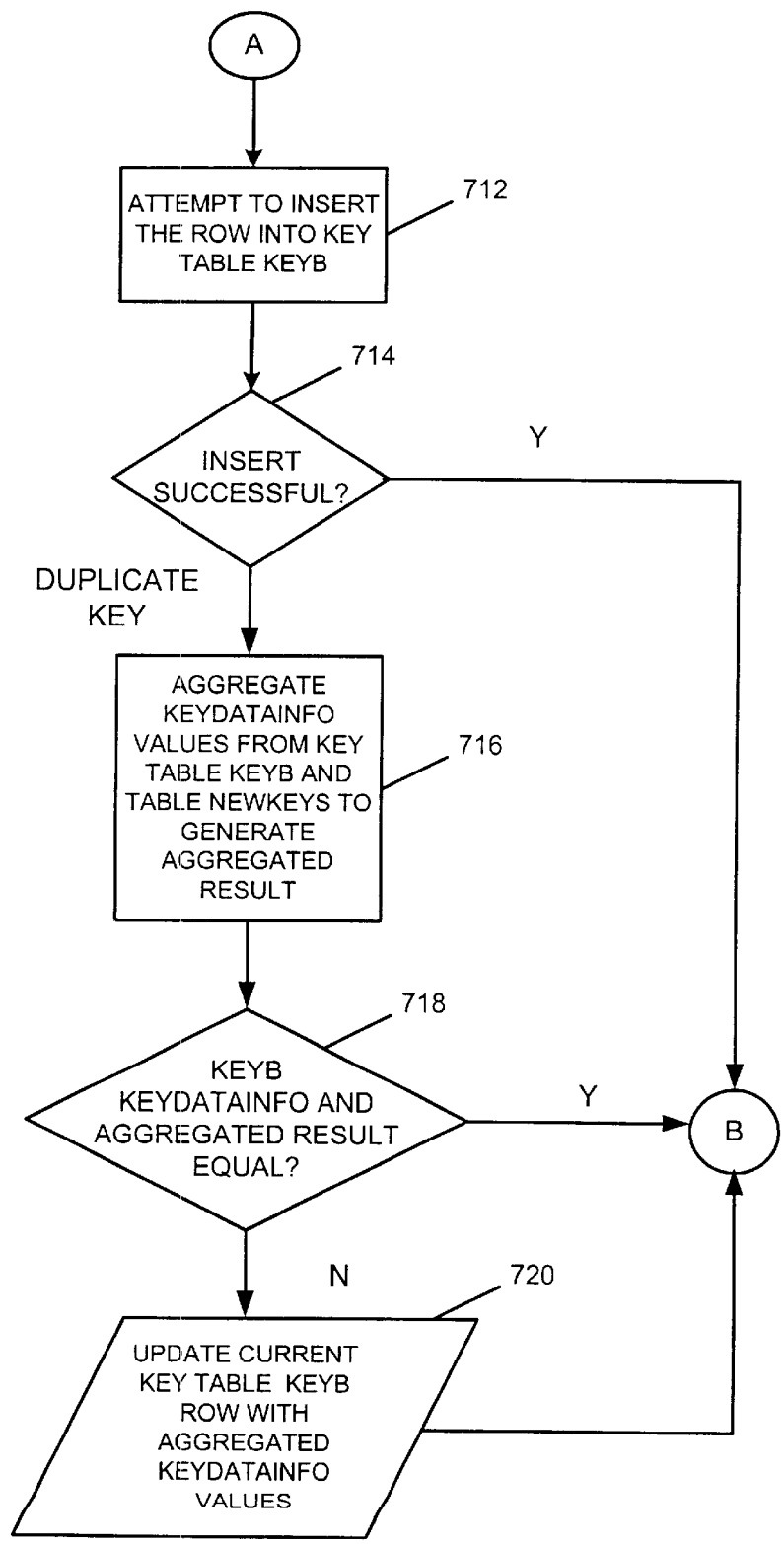

FIGS. 7A–7B are a flow diagram illustrating the process performed by the relational storage manager 114 to perform the first technique. In block 700, the relational storage manager 114 creates a new, empty key table KEYB. In block 702, the relational storage manager 114 selects all rows from key table KEYA. In block 704, the relational storage manager 114 determines whether all rows of key table KEYA have been processed. If so, the relational storage manager 114 continues to block 706, otherwise, the relational storage manager 114 continues to block 707. In block 706, after successfully looping through all of the old blocks, the relational storage manager 114 drops key table KEYA.

While there are rows to be processed, in block 707, the relational storage manager 114 passes the block key attribute in the current row of key table KEYA to a function in the OLAP engine 112, which returns a table NEWKEYS. The table NEWKEYS has two columns: one column holds new block keys, referred to as unprocessed block keys, and the other column holds corresponding KeyDataInfo values. In block 708, the relational storage manager 114 advances to the next row of table NEWKEYS, starting with the first row. In block 709, the relational storage manager 114 determines whether it is done processing all of the rows of the table NEWKEYS. If so, the relational storage manager 114 continues to block 704, otherwise, the relational storage manager 114 continues to block 710. For the current row of table NEWKEYS, in block 710, the relational storage manager 114 constructs a row for key table KEYB using the block key and KeyDataInfo values from the current row of table NEWKEYS.

In block 712, the relational storage manager 114 attempts to insert a row into key table KEYB. In block 714, the relational storage manager 114 determines whether the insert was successful. If so, the relational storage manager 114 continues to block 708. If there is a duplicate key, the relational storage manager 114 continues to block 716.

In block 716, the relational storage manager 114 aggregates KeyDataInfo values from key table KEYB and table NEWKEYS to generate an aggregated result. In block 718, the relational storage manager 114 determines whether the KeyDataInfo value of key table KEYB and the aggregated result are equal. If so, the relational storage manager 114 continues to block 708, otherwise, the relational storage manager 114 continues to block 720. In block 720, the relational storage manager 114 updates the current key table KEYB row with the aggregated KeyDataInfo values (i.e., the aggregated result).

Although all error cases are not illustrated in the flow diagrams herein, it is to be understood that if there were any other error, the relational storage manager 114 would exit with an error and, in some cases, issue an error message.

Second Technique

Another embodiment of the invention provides a second technique for rebuilding a key table. With this technique, to improve performance, the relational storage manager 114 takes advantage of the data and index memory caches. The sizes of these caches are based on user settings. The relational storage manager 114 flushes these caches and frees the memory before starting to rebuild a key table after a multi-dimensional database has been restructured. When the key table needs to be rebuilt, the relational storage manager 114 allocates memory the size of the combined data and index caches. Then, the relational storage manager uses the memory to hold some or all of the new key table KEYB in memory. The memory is used as a large, contiguous array of rows. A simple hashing technique on the BLOCKKEY is used to decide where to put each row in memory.

When restructure is occurring, input/output (I/O) is halted. The data and index memory caches are typically used for I/O. Therefore, when I/O is halted, the second technique takes advantage of these memory caches that would otherwise remain unused.

For the second technique to build the new key table KEYB from the old key table KEYA, the relational storage manager 114 rebuilds the key table KEYB by the following process:

1. Create a new, empty key table KEYB.
2. Loop through each row (corresponding to a block) in the old key table KEYA.
   2a. Pass the block key attribute in the current row to a function in the OLAP engine 112. This function returns a table NEWKEYS with two columns. One column holds new block keys, referred to as unprocessed block keys, and the other column holds corresponding KeyDataInfo values.
   2b. Loop through each row in the table NEWKEYS.
      2bi. For the current row in the table NEWKEYS, attempt to insert a new row into the in-memory table using a hashing technique. For the new row, the block key and KeyDataInfo values are obtained from the current row of the NEWKEYS table, while the TIME1 and TIME2 values are a constant value associated with the restructure time.
      2bii. If an attempt is made to insert a new block key which is the same as a block key already in the in-memory table (i.e., they match), aggregate the KeyDataInfo values of the current row of table NEWKEYS and the located block key already in the in-memory table to generate an aggregated result, determine whether the KeyDataInfo value for the in-memory table and the aggregated result are equal, and, if so, update the selected row of the in-memory table with the aggregated result.
      2biii. If the attempt is successful, continue processing at Step 2b.
      2biv. If the attempt is unsuccessful because there is no room for a new row in the in-memory table, store all of the rows from memory to key table KEYB and continue processing with the First Technique.
3. After processing all rows in the old key table KEYA, insert all rows in memory into key table KEYB as a single SQL INSERT statement.
4. Drop the old key table KEYA.

For the rows in key table KEYB that can fit into memory, this approach offers several benefits. One of the most important benefits is that all updates (including handling of duplicates) occur in memory, and so no SQL update statements are required. Additionally, the relational storage manager 114 exploits any performance benefits offered by array insert, because many rows (e.g., a thousand) are processed with each insert statement.

Another performance advantage of the second technique is that logging can be turned off while writing rows from memory into the new key table KEYB. Logging has high overhead, so it is desirable to turn off logging while inserting rows into key table KEYB, if possible. In some relational databases (e.g., a workstation version of IBM DB2 UDB), inserts and updates are logged to a journal so that all changes for a transaction can be "rolled back" in the event of an error. In some relational databases that perform this logging, logging for a table can be suspended during a transaction, and resumed later. When logging is turned off, any SQL error causes the DB2 server 116 to mark the table as unusable.

In the first technique, if logging is turned off for key table KEYB, then key table KEYB would be marked as unusable as soon as an attempt was made to insert a row with a duplicate block key since violating the unique index is considered to be an error. In the second technique, there are no duplicates in memory, so all rows can be written to key table KEYB with logging turned off. If the relational storage manager 114 runs out of memory, then logging for key table KEYB is turned back on before switching over to the first technique to complete the task.

In order to process the in-memory instance of key table KEYB, the relational storage manager 114 stores rows using a data structure that allows a row with a given key to be located very quickly. A hash table meets this basic requirement. However, a hash table does not allow the rows to be traversed in key sequence, so rows cannot be inserted into key table KEYB in key sequence. In one embodiment of the second technique, the relational storage manager 114 uses a hash table to store rows in memory.

Most relational databases can insert rows into a table with an index somewhat more efficiently if rows are inserted in key sequence. Therefore, if a data structure is used that allows a row with a given key to be accessed quickly and also allows the rows of the table to be traversed in key sequence, there may be a minor incremental benefit. Binary trees are structures that satisfy both requirements. In another embodiment of the second technique, the relational storage manager 114 uses a binary tree to store rows in memory.

Figure 8A:
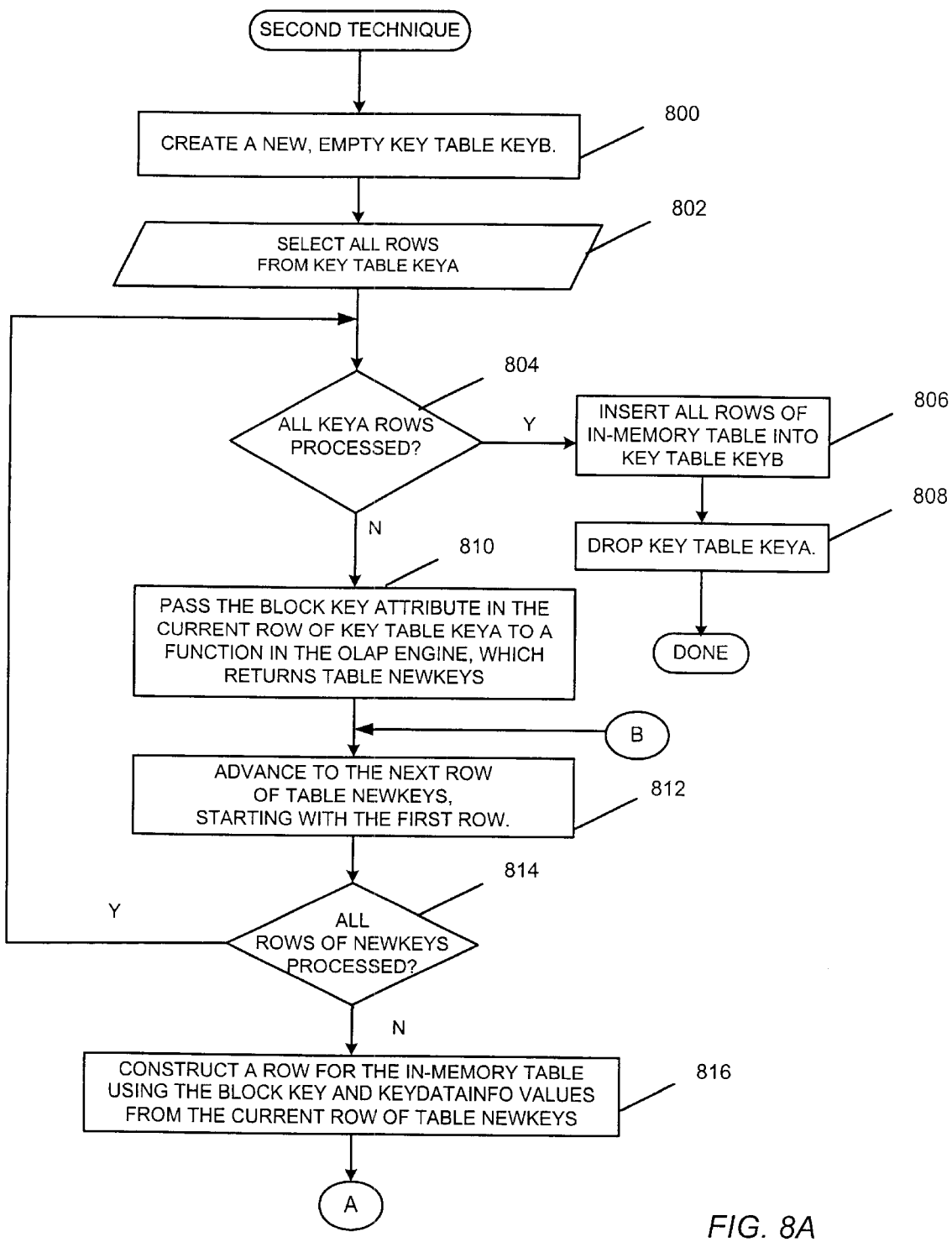
FIGS. 8A–8B are a flow diagram illustrating the process performed by the relational storage manager to perform the second technique.
Figure 8B:
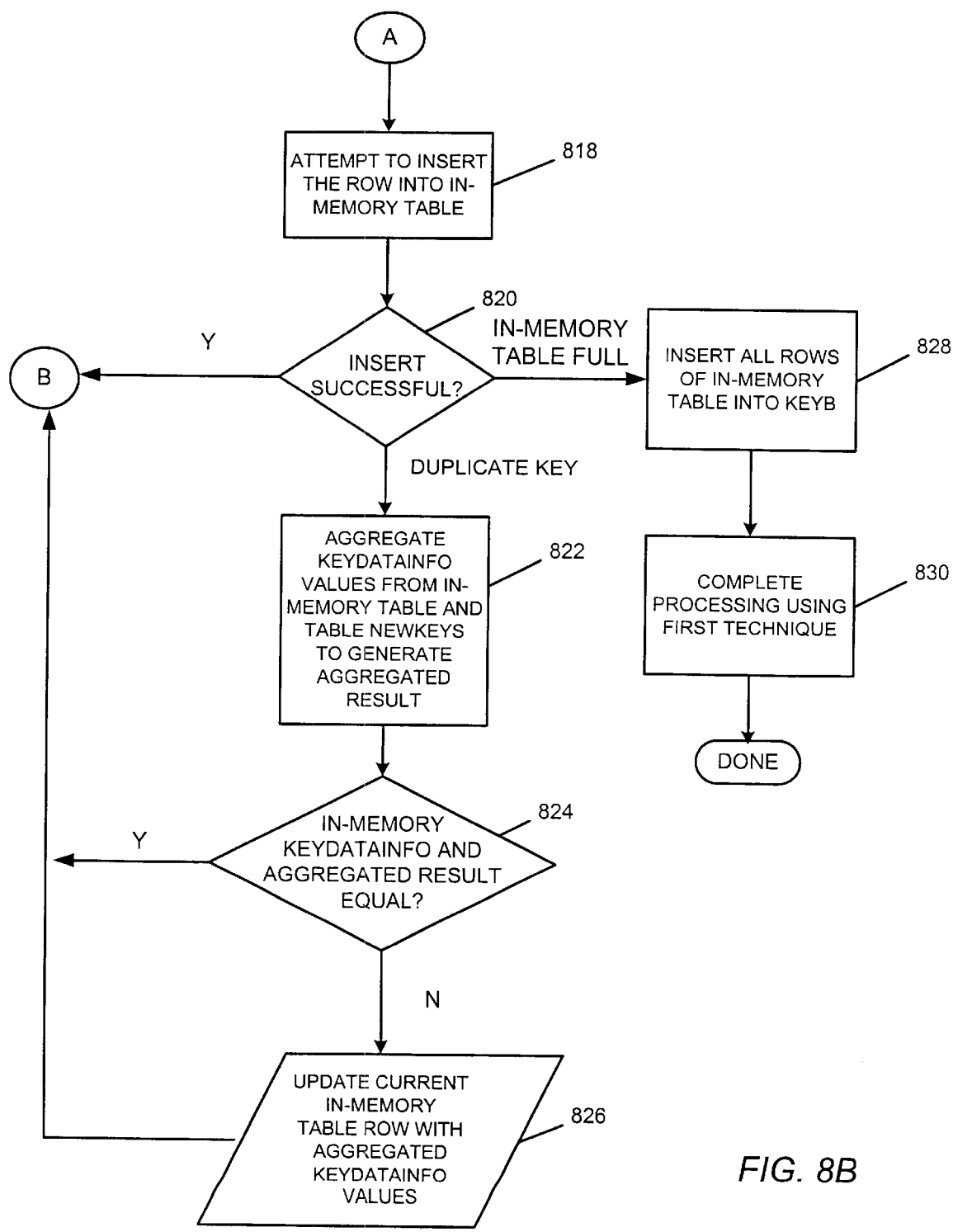

FIGS. 8A–8B are a flow diagram illustrating the process performed by the relational storage manager 114 to perform the second technique. In block 800, the relational storage manager 114 creates a new, empty key table KEYB. In block 802, the relational storage manager 114 selects all rows from key table KEYA. In block 804, the relational storage manager 114 determines whether all rows of key table KEYA have been processed. If so, the relational storage manager 114 continues to block 806, otherwise, the relational storage manager 114 continues to block 810.

In block 806, after successfully looping through all of the old blocks, the relational storage manager 114 inserts all rows of in-memory the in-memory table into key table KEYB and, in block 808, drops key table KEYA.

While there are rows to be processed, in block 810, the relational storage manager 114 passes the block key attribute in the current row of key table KEYA to a function in the OLAP engine 112, which returns a table NEWKEYS. The table NEWKEYS has two columns: one column holds new block keys, referred to as unprocessed block keys, and the other column holds corresponding KeyDataInfo values. In block 812, the relational storage manager 114 advances to the next row of table NEWKEYS, starting with the first row. In block 814, the relational storage manager 114 determines whether it is done processing all of the rows of the table NEWKEYS. If so, the relational storage manager 114 continues to block 804, otherwise, the relational storage manager 114 continues to block 816. For the current row of table NEWKEYS, in block 816, the relational storage manager 114 constructs a row for the in-memory table using the block key and KeyDataInfo values from the current row of table NEWKEYS.

In block 818, the relational storage manager 114 attempts to insert a row into the in-memory table. In block 820, the relational storage manager 114 determines whether the insert was successful. If so, the relational storage manager 114 continues to block 812. If there is a duplicate key, the relational storage manager 114 continues to block 822. If the in-memory table is full, the relational storage manager 114 continues to block 828.

In block 822, the relational storage manager 114 aggregates KeyDataInfo values from the in-memory table and table NEWKEYS to generate an aggregated result. In block 824, the relational storage manager 114 determines whether the KeyDataInfo value of the in-memory table and the aggregated result are equal. If so, the relational storage manager 114 continues to block 812, otherwise, the relational storage manager 114 continues to block 826. In block 826, the relational storage manager 114 updates the current in-memory table row with the aggregated KeyDataInfo values (i.e., the aggregated result).

In block 828, the relational storage manager inserts all rows of the in-memory table into table KEYB. In block 830, the relational storage manager 114 completes processing using the first technique.

Although all error cases are not illustrated in the flow diagrams herein, it is to be understood that if there were any other error, the relational storage manager 114 would exit with an error and, in some cases, issue an error message.

Once the relational storage manager 114 runs out of memory and transfers the rows in memory into key table KEYB, the relational storage manager does not put any more rows into memory, but switches back to using the first technique to finish rebuilding the new key table KEYB. Consequently, for an outline that results in a large number of blocks or when only a small cache is available, performance may be improved by using the third technique.

Third Technique

A further embodiment of the invention provides a third technique for rebuilding a key table. In particular, in the second technique, if memory fills up, the relational storage manager 114 transfers the contents of memory to a key table KEYB and stops using memory. However, potentially, the cache memory could be reused. That is, instead of switching to the first technique after running out of memory, the relational storage manager 114 stores the rows in memory into the key table KEYB, deletes the in-memory instance of key table KEYB, and continues processing rows from key table KEYA by storing rows for key table KEYB into an in-memory sub-table of key table KEYB. When available memory is exhausted or all rows from key table KEYA have been processed, the relational storage manager 114 merges the in-memory sub-table with the key table KEYB, which is also referred to as a relational table because it is stored in a relational database, unlike the in-memory table, which is stored in memory. This can be done efficiently by selecting all rows from key table KEYB in key sequence and processing them with an updatable cursor. The rows of the in-memory table are also processed in key sequence. Thus, a relational cursor points to a relational row in the relational table KEYB, while an in-memory cursor points to an in-memory row in the in-memory table. The two tables are then merged by examining the next row available from the two sets of table B rows. For each pair of rows processed, one of three conditions exists:

The keys match, in which case the relational storage manager 114 merges the values from the two rows and updates the key table KEYB with the merged values (if the merged values are different than the values already in the relational table). The in-memory row is deleted.

The block key of the in-memory row is smaller than the block key of the relational row, in which case the relational storage manager 114 moves the in-memory cursor to the next row of the in-memory table.

The block key of the relational row is smaller than the block key of the in-memory row, in which case the relational storage manager 114 moves the relational cursor to the next row in relational table KEYB.

When all in-memory rows have been processed, the relational storage manager 114 inserts all of the rows remaining in the in-memory table into the relational table KEYB using array insert.

For the third technique, the data structure for the in-memory subset of key table KEYB, in one embodiment, must be traversable in key sequence.

Figure 9A:
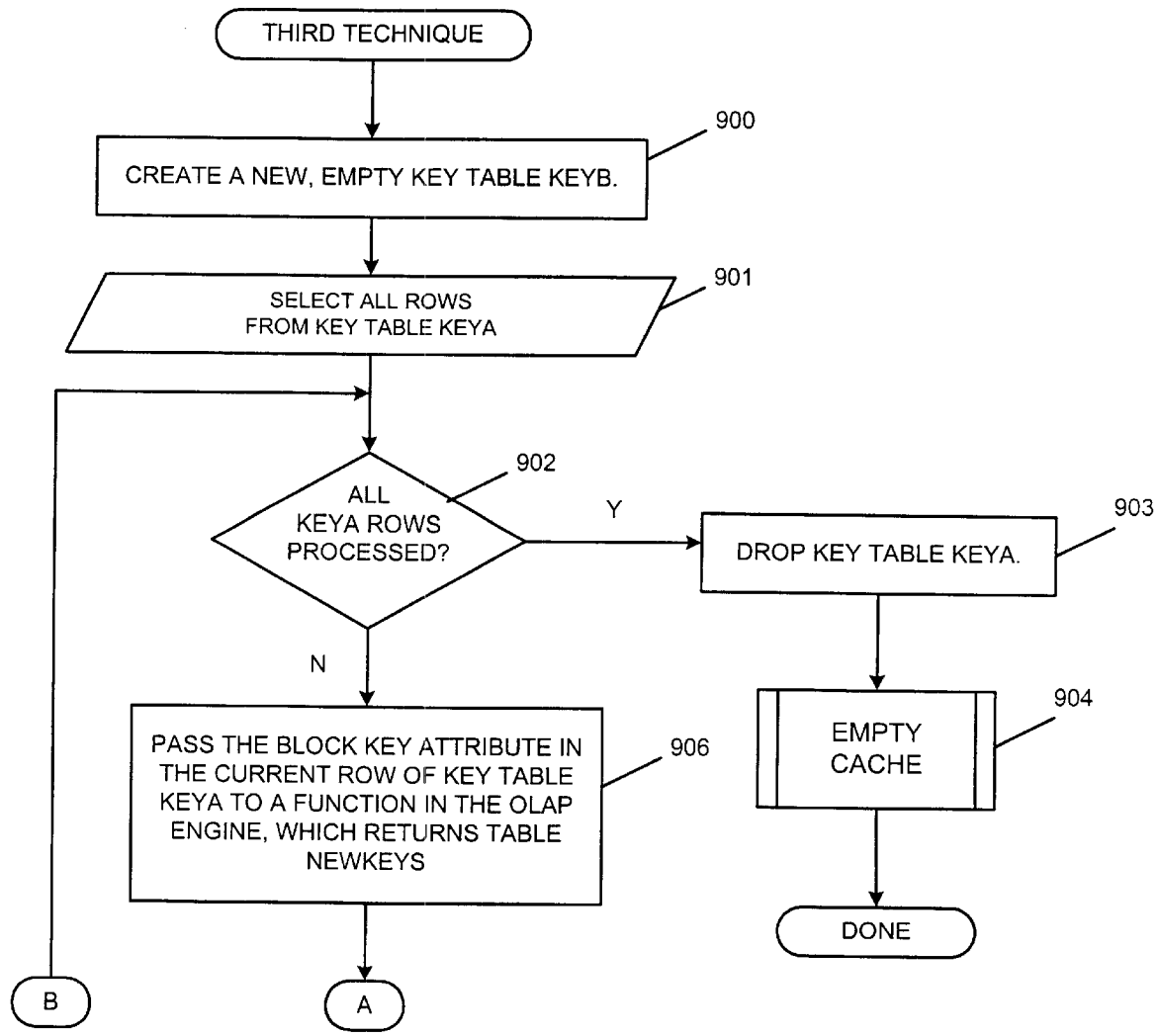
FIGS. 9A–9B are a flow diagram illustrating the process performed by the relational storage manager to perform the third technique.
Figure 9B:
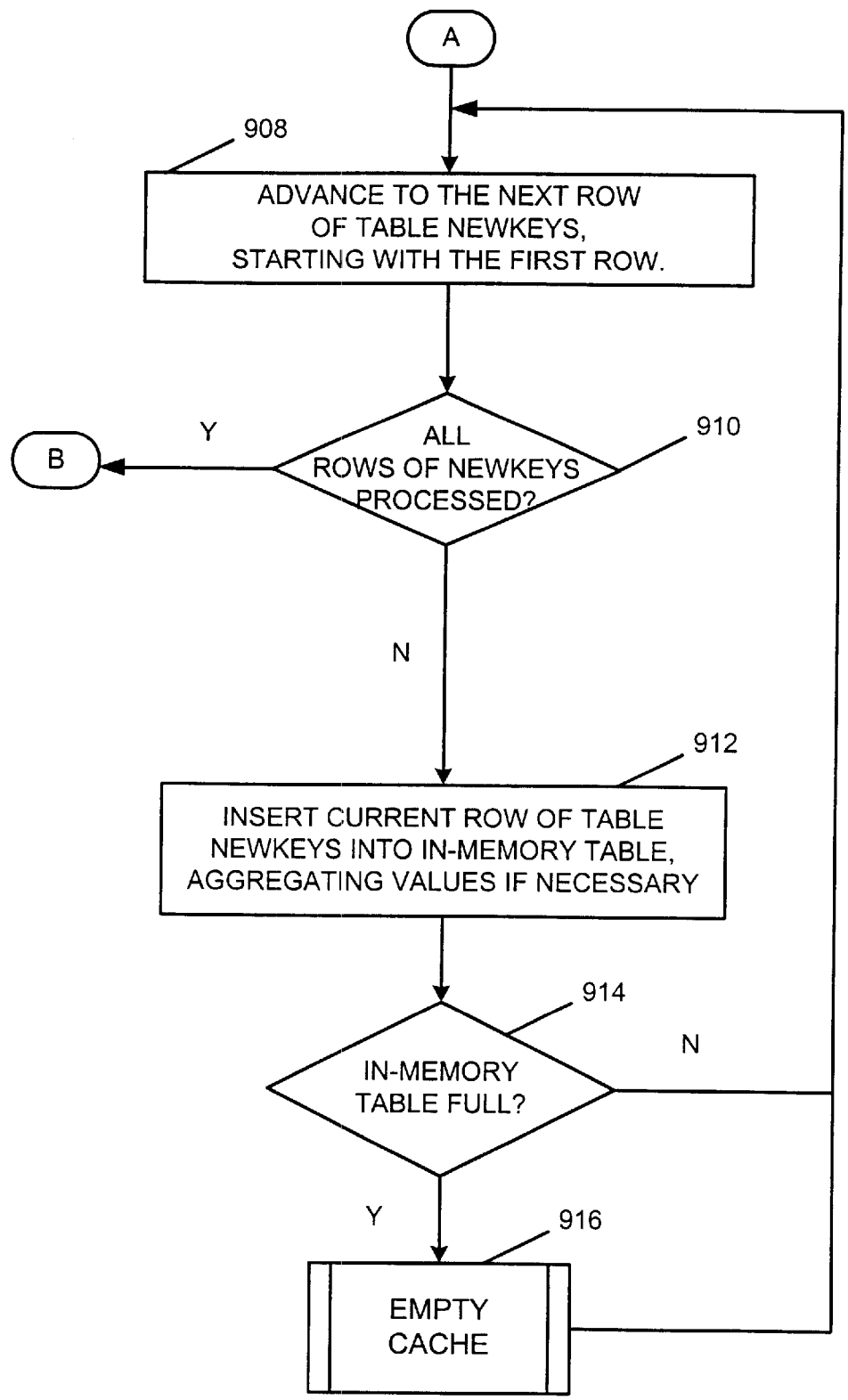

FIGS. 9A–9B are a flow diagram illustrating the process performed by the relational storage manager 114 to perform the third technique. In block 900, the relational storage manager 114 creates a new, empty key table KEYB. In block 901, the relational storage manager 114 selects all rows from key table KEYA. In block 902, the relational storage manager 114 determines whether all rows of key table KEYA have been processed. If so, the relational storage manager 114 continues to block 903, otherwise, the relational storage manager 114 continues to block 906. In block 903, the relational storage manager drops key table KEYA. In block 904, relational storage manager 114 calls a subroutine, Empty Cache (which will be described below with respect to FIG. 10).

In block 906, the relational storage manager 114 passes the block key attribute in the current row of key table KEYA to a function in the OLAP engine, which returns table NEWKEYS.

In block 908, the relational storage manager 114 advances to the next row of table NEWKEYS, starting with the first row. In block 910, the relational storage manager 114 determines whether each row of the table NEWKEYS has been processed. If so, the relational storage manager 114 continues to block 902, otherwise, the relational storage manager 114 continues to block 912. In block 912, the relational storage manager 114 inserts the current row of table NEWKEYS into the in-memory table, aggregating values if necessary, which is described in further detail with respect to the first and second techniques. In block 914, the relational storage manager 114 determines whether the in-memory table is full. If so, the relational storage manager 114 continues to block 916, otherwise, the relational storage manager 114 continues to block 908. In block 916, the relational storage manager 114 calls a subroutine, Empty Cache.

Although all error cases are not illustrated in the flow diagrams herein, it is to be understood that if there were any other error, the relational storage manager 114 would exit with an error and, in some cases, issue an error message.

Figure 10:
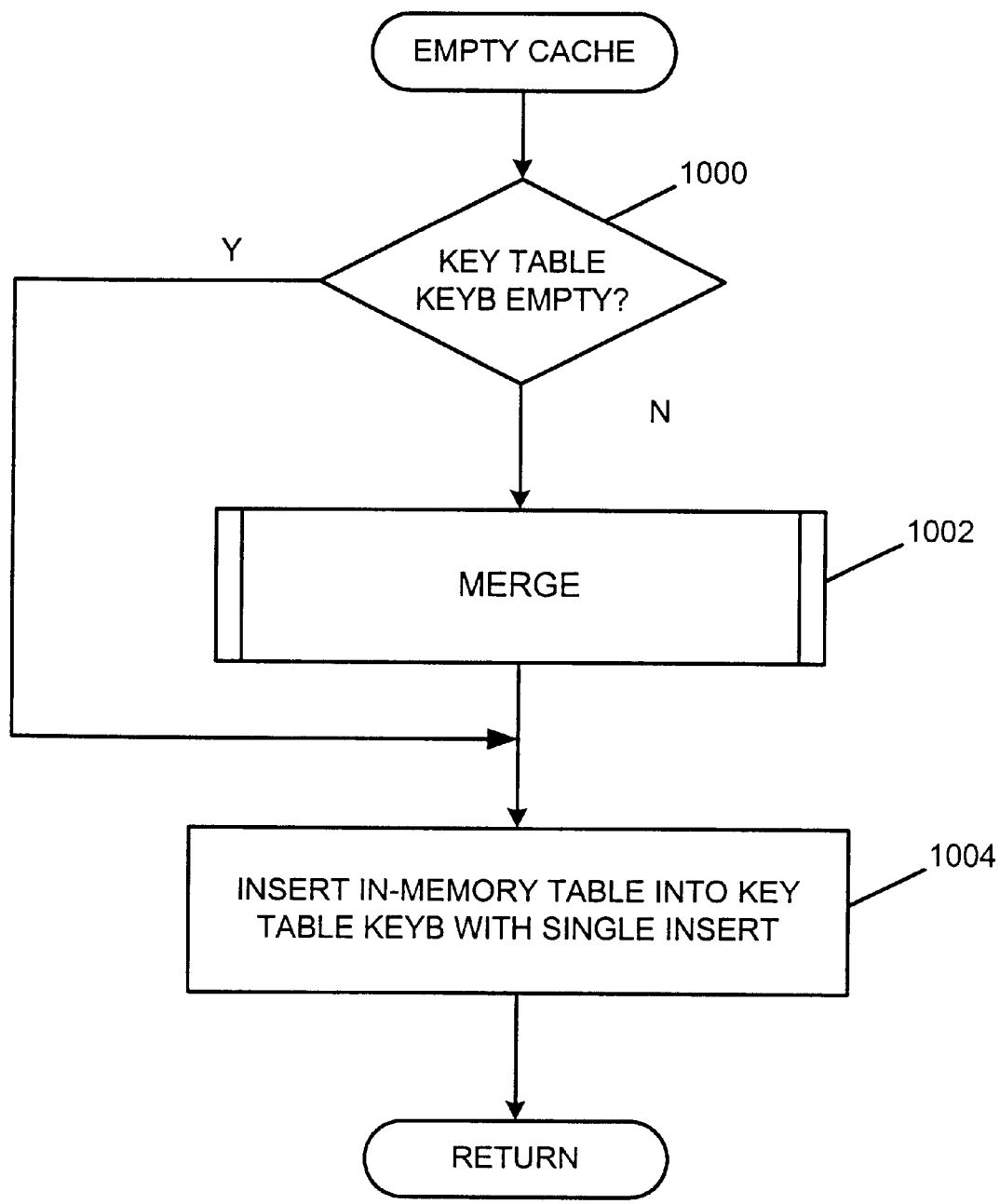
FIG. 10 is a flow diagram illustrating the process performed by the relational storage manager to empty a cache.

FIG. 10 is a flow diagram illustrating the process performed by the relational storage manager to empty a cache. In block 1000, the relational storage manager 114 determines whether the key table KEYB is empty. If so, the relational storage manager 114 continues to block 1004, otherwise, the relational storage manager 114 continues to block 1002. In block 1002, the relational storage manager 114 merges the in-memory table with key table KEYB by calling a subroutine, MERGE (which will be described below with respect to FIG. 11). In block 1004, the relational storage manager 114 inserts the in-memory table into key table KEYB with a single INSERT.

Although all error cases are not illustrated in the flow diagrams herein, it is to be understood that if there were any other error, the relational storage manager 114 would exit with an error and, in some cases, issue an error message.

Figure 11:
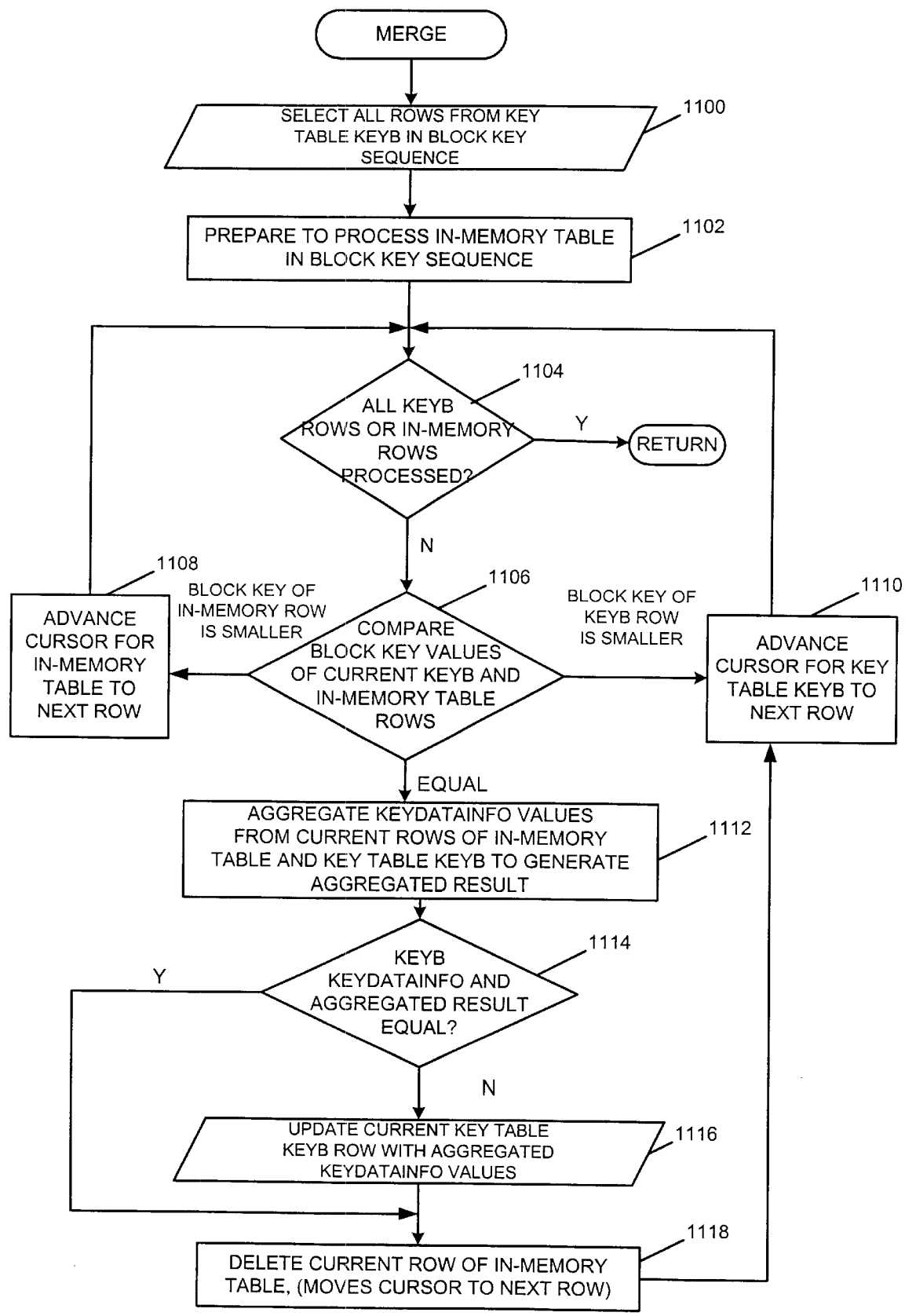
FIG. 11, is a flow diagram illustrating the process performed by the relational storage manager to merge rows for the third technique.

FIG. 11 is a flow diagram illustrating the process performed by the relational storage manager 114 to merge rows for the third technique. In block 1100, the relational storage manager 114 selects all rows from key table KEYB in block key sequence. In block 1102, the relational storage manager 114 prepares to process the in-memory table in block key sequence. In block 1104, the relational storage manager 114 determines whether all rows of key table KEYB or all rows of the in-memory table have been processed. If so, the relational storage manager 114 returns, otherwise, the relational storage manager 114 continues to block 1106.

In block 1106, the relational storage manager 114 compares the block key values of current key table KEYB and in-memory table rows. If the block key value of the in-memory table row is smaller, the relational storage manager 114 continues to block 1108 and advances the cursor for the in-memory table to the next row. If the block key value of the key table KEYB row is smaller, the relational storage manager 114 continues to block 1110 and advances the cursor for key table KEYB to the next row. If the block key values are equal, the relational storage manager 114 continues to block 1112.

In block 1112, the relational storage manager 114 aggregates KeyDataInfo values from current rows of the in-memory table and key table KEYB to generate an aggregated result. In block 1114, the relational storage manager 114 determines whether the KeyDataInfo value of key table KEY and the aggregated result are equal. If so, the relational storage manager 114 continues to block 1118, otherwise, the relational storage manager 114 continues to block 1116. In block 1116, the relational storage manager 114 updates the current key table KEYB row with the aggregated KeyDataInfo values (i.e., the aggregated result). In block 1118, the relational storage manager 114 deletes the current row of the in-memory table and moves the cursor to the next row.

Although all error cases are not illustrated in the flow diagrams herein, it is to be understood that if there were any other error, the relational storage manager 114 would exit with an error and, in some cases, issue an error message.

The techniques described above have several advantages. One advantage is that the invention is able to use memory that is already dedicated to the OLAP engine, but which is not being used otherwise. This leads to a better use of resources. Additionally, the techniques are applicable not only to the system disclosed herein, but also to many other systems.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a command in a computer to perform a database operation on a relational database stored on a data store connected to the computer, the method comprising the steps of:
   determining that a multi-dimensional database has been restructured; and
   rebuilding a key table of the relational database to correspond to the restructured multidimensional database.

2. The method of claim 1, wherein the key table comprises rows having attributes for block keys and key data information and wherein said rebuilding comprises:
   creating a new key table; and
   for each row of an old key table,
      obtaining one or more block keys and key data information; and
      inserting the obtained block keys and key data information as a new row in the new key table.

3. The method of claim 2, further comprising:
   determining, for each said obtained one or more block keys, whether the inserting was unsuccessful because of duplication of an existing block key in a row of the new key table by the obtained one or more block keys and, based on the determining that the inserting was unsuccessful, performing the steps of:
      obtaining the duplicated row and associated new key data information from the new key table;
      aggregating the old key table key data information and the new key data information to obtain an aggregated result;
      determining whether the aggregated result matches the new key data information of the row of the new key table; and
      updating the row of the new key table with the aggregated key data information based on the determining that the aggregated result matches the new key data information.

4. The method of claim 2, further comprising deleting the old key table.

5. The method of claim 1, wherein the key table comprises rows having attributes for block keys and key data information and wherein said rebuilding comprises:
   allocating memory for rows of a new key table; and
   for each row of an old key table,
      obtaining one or more block keys and key data information; and
      inserting the obtained block keys and key data information as a new row in memory.

6. The method of claim 5, wherein the memory comprises data and index memory caches that would otherwise be used by input/output processes that were halted when the database was restructured.

7. The method of claim 5, further comprising:
   determining for each obtained block key whether the inserting was unsuccessful because of duplication of an existing block key in a row of the memory by the obtained block key and, based on the determining that the inserting was unsuccessful, performing the steps of:
      obtaining the duplicated row and associated new key data information from the memory;
      aggregating the old key table key data information and the new key data information to obtain an aggregated result;
   determining whether the aggregated result matches the new key data information of the block key in a row of the memory; and
      updating the row in memory with the aggregated key data information based on the determining that the aggregated result matches the new key data information.

8. The method of claim 5, wherein each row comprises time attributes and further comprising updating the time attributes in each row in memory.

9. The method of claim 5, further comprising inserting all rows of the memory into a new key table.

10. The method of claim 5, further comprising inserting all rows of the memory into a new key table with a single insert without logging.

11. The method of claim 5, further comprising:
   determining that the memory is full;
   inserting rows of the memory into a new key table; and
   processing remaining rows of the old key table by inserting each row into the new key table.

12. The method of claim 5, further comprising:
   determining that the memory is full;
   inserting rows of the memory into a new key table; and
   processing remaining rows of the old key table by,
      inserting each row into a sub-table in memory; and
      merging the inserted rows into the new key table.

13. The method of claim 12, wherein merging comprises comparing a row of the sub-table with a row of the new key table.

14. The method of claim 13, wherein block keys of the compared rows match and further comprising:
   merging values from the rows; and
   updating the new key table with the merged values.

15. The method of claim 13, wherein a block key of the row of the sub-table is smaller than the block key of a row of the new key table and further comprising moving a sub-table cursor to the next row of the sub-table.

16. The method of claim 13, wherein a block key of the row of the new key table is smaller than the block key of a row of the sub-table and further comprising moving a new key table cursor to the next row of the new key table.

17. An apparatus for executing a command in a computer, comprising:
   a computer having a data store coupled thereto, wherein the data store stores a relational database;
   one or more computer programs, performed by the computer, for determining that a multi-dimensional database has been restructured and rebuilding a key table of the relational database to correspond to the restructured multidimensional database.

18. The apparatus of claim 17, wherein the key table comprises rows having attributes for block keys and key data information and wherein rebuilding comprises:
   creating a new key table; and
   for reach row of an old key table,
      obtaining one or more block keys and key data information; and
      inserting the obtained block keys and key data information as a new row in the new key table.

19. The apparatus of claim 18, wherein, the rebuilding further comprises:
   determining for each obtained block key whether the inserting was unsuccessful because of duplication of an existing block key in a row of the new key table by the obtained block key and, based on the determining that the inserting was unsuccessful, performing the steps of:
      obtaining the duplicated row and associated new key data information from the new key table;
      aggregating the old key table key data information and the new key data information to obtain an aggregated result;
      determining whether the aggregated result matches the new key data information of the row of the new key table; and updating the row of the new key table with the aggregated key data information based on the determining that the aggregated result matches the new key data information.

20. The apparatus of claim 18, wherein the rebuilding further comprises deleting the old key table.

21. The apparatus of claim 17, wherein the key table comprises rows having attributes for block keys and key data information and wherein said rebuilding comprises:
allocating memory for rows of a new key table; and
for each row of an old key table,
obtaining one or more block keys and a key data information; and
inserting the obtained block keys and key data information as a new row in memory.

22. The apparatus of claim 21, wherein the memory comprises data and index memory caches that would otherwise be used by input/output processes that were halted when the database was restructured.

23. The apparatus of claim 21, wherein, the rebuilding further comprises:
determining for each obtained block key whether the inserting was unsuccessful because of duplication of an existing block key in a row of the memory by the obtained block key and, based on the determining that the inserting was unsuccessful, performing the steps of:
obtaining the duplicated row and associated new key data information from the memory;
aggregating the old key table key data information and the new key data information to obtain an aggregated result;
determining whether the aggregated result matches the new key data information of the block key in a row of the memory; and
updating the row in memory with the aggregated key data information based on the determining that the aggregated result matches the new key data information.

24. The apparatus of claim 21, wherein each row comprises time attributes and further comprising updating the time attributes in each row in memory.

25. The apparatus of claim 21, wherein the rebuilding further comprises inserting all rows of the memory into a new key table.

26. The apparatus of claim 21, wherein the rebuilding further comprises inserting all rows of the memory into a new key table with a single insert without logging.

27. The apparatus of claim 21, wherein the rebuilding further comprises:
determining that the memory is full; inserting rows of the memory into a new key table; and
processing remaining rows of the old key table by inserting each row into the new key table.

28. The apparatus of claim 21, wherein the rebuilding further comprises:
determining that the memory is full;
inserting rows of the memory into a new key table; and
processing remaining rows of the old key table by:
inserting each row into a sub-table in memory; and
merging the inserted rows into the new key table.

29. The apparatus of claim 28, wherein merging comprises comparing a row of the sub-table with a row of the new key table.

30. The apparatus of claim 29, wherein block keys of the compared rows match and further comprising:
merging values from the rows; and
updating the new key table with the merged values.

31. The apparatus of claim 29, wherein a block key of the row of the sub-table is smaller than the block key of a row of the new key table and further comprising moving a sub-table cursor to the next row of the sub-table.

32. The apparatus of claim 29, wherein a block key of the row of the new key table is smaller than the block key of a row of the sub-table and further comprising moving a new key table cursor to the next row of the new key table.

33. An article of manufacture comprising a program storage medium readable by a computer and embodying one or more instructions executable by the computer to perform method steps for executing a command to perform a database operation on a relational database stored on a data store connected to the computer, the method comprising the steps of:
determining that a multi-dimensional database has been restructured; and
rebuilding a key table of the relational database to correspond to the restructured multidimensional database.

34. The article of manufacture of claim 33, wherein the key table comprises rows having attributes for block keys and key data information and wherein said rebuilding comprises:
creating a new key table; and
for each row of an old key table,
obtaining one or more block keys and key data information; and
inserting the obtained block keys and key data information as a new row in the new key table.

35. The article of manufacture of claim 34, wherein the rebuilding further comprises:
determining for each obtained block key whether the inserting was unsuccessful because of duplication of an existing block key in a row of the new key table by the obtained block key and, based on the determining that the inserting was unsuccessful, performing the steps of:
obtaining the duplicated row and associated new key data information from the new key table;
aggregating the old key table key data information and the new key data information to obtain an aggregated result;
determining whether the aggregated result matches the new key data information of the row of the new key table; and
updating the row of the new key table with the aggregated key data information based on the determining that the aggregated result matches the new key data information.

36. The article of manufacture of claim 34, further comprising deleting the old key table.

37. The article of manufacture of claim 33, wherein the table comprises rows having attributes for a block keys and key data information and wherein rebuilding comprises:
allocating memory for rows of a new key table; and
for each row of an old key table,
obtaining one or more block keys and key data information; and
inserting the obtained block keys and key data information as a new row in memory.

38. The article of manufacture of claim 37, wherein the memory comprises data and index memory caches that would otherwise be used by input/output processes that were halted when the database was restructured.

39. The article of manufacture of claim 37, wherein, the rebuilding further comprises:

determining for each obtained block key whether the inserting was unsuccessful because of duplication of an existing block key in a row of the memory by the obtained block key and, based on the determining that the inserting was unsuccessful, performing the steps of:

obtaining the duplicated row and associated new key data information from the memory;

aggregating the old key table key data information and the new key data information to obtain an aggregated result;

determining whether the aggregated result matches the new key data information of the block key in a row of the memory; and updating the row in memory with the aggregated key data information based on the determining that the aggregated result matches the new key data information.

40. The article of manufacture of claim 37, wherein each row comprises time attributes and further comprising updating the time attributes in each row in memory.

41. The article of manufacture of claim 37, wherein the rebuilding further comprises inserting all rows of the memory into a new key table.

42. The article of manufacture of claim 37, wherein the rebuilding further comprises inserting all rows of the memory into a new key table with a single insert without logging.

43. The article of manufacture of claim 37, wherein the rebuilding further comprises:

determining that the memory is full;

inserting rows of the memory into a new key table; and processing remaining rows of the old key table by inserting each row into the new key table.

44. The article of manufacture of claim 37, wherein the rebuilding further comprises:

determining that the memory is full;

inserting rows of the memory into a new key table; and processing remaining rows of the old key table by:

inserting each row into a sub-table in memory; and merging the inserted rows into the new key table.

45. The article of manufacture of claim 44, wherein merging comprises comparing a row of the sub-table with a row of the new key table.

46. The article of manufacture of claim 45, wherein block keys of the compared rows match and further comprising:

merging values from the rows; and updating the new key table with the merged values.

47. The article of manufacture of claim 45, wherein a block key of the row of the sub-table is smaller than the block key of a row of the new key table and further comprising moving a sub-table cursor to the next row of the sub-table.

48. The article of manufacture of claim 45, wherein a block key of the row of the new key table is smaller than the block key of a row of the sub-table and further comprising moving a new key table cursor to the next row of the new key table.

* * * * *